(12) United States Patent
Wang et al.

(10) Patent No.: US 12,363,342 B2
(45) Date of Patent: Jul. 15, 2025

(54) VIDEO DECODING METHOD, VIDEO ENCODING METHOD, ELECTRONIC DEVICE, AND STORAGE MEDIUM

(71) Applicant: TENCENT TECHNOLOGY (SHENZHEN) COMPANY LIMITED, Shenzhen (CN)

(72) Inventors: Yingbin Wang, Shenzhen (CN); Xiaozhong Xu, Shenzhen (CN); Shan Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 232 days.

(21) Appl. No.: 17/946,488

(22) Filed: Sep. 16, 2022

(65) Prior Publication Data

US 2023/0017193 A1    Jan. 19, 2023

Related U.S. Application Data

(63) Continuation of application No. PCT/CN2021/107756, filed on Jul. 22, 2021.

(30) Foreign Application Priority Data

May 26, 2020   (CN) .......................... 202010457090.2

(51) Int. Cl.
*H04N 19/00*   (2014.01)
*H04N 19/129*  (2014.01)
(Continued)

(52) U.S. Cl.
CPC ......... *H04N 19/593* (2014.11); *H04N 19/129* (2014.11); *H04N 19/172* (2014.11);
(Continued)

(58) Field of Classification Search
CPC .. H04N 19/593; H04N 19/129; H04N 19/172; H04N 19/174; H04N 19/176; H04N 19/186; H04N 19/70
See application file for complete search history.

(56) References Cited

U.S. PATENT DOCUMENTS

| | | | |
|---|---|---|---|
| 7,330,509 B2 | 2/2008 | Lu et al. |
| 7,983,496 B2 | 7/2011 | Liu et al. |

(Continued)

FOREIGN PATENT DOCUMENTS

| | | | |
|---|---|---|---|
| CN | 106797473 A | 5/2017 |
| CN | 107071450 A | 8/2017 |

(Continued)

OTHER PUBLICATIONS

The World Intellectual Property Organization (WIPO) International Search Report for PCT/CN2021/107756 Oct. 13, 2021 7 Pages (including translation).

(Continued)

*Primary Examiner* — Zhihan Zhou
(74) *Attorney, Agent, or Firm* — ANOVA LAW GROUP PLLC

(57) ABSTRACT

The present disclosure provides a video decoding method. The method includes obtaining a bitstream that needs to be decoded, the bitstream that needs to be decoded comprising a current decoding block, the current decoding block using an intra string copy mode, and the current decoding block comprising a current string; determining a string length encoding resolution of the current string; decoding the bitstream that needs to be decoded to obtain an encoded string length corresponding to the current string; and obtaining a string length of the current string according to the string length encoding resolution of the current string and the corresponding encoded string length. The string length encoding resolution of the current string is at least one of the (Continued)

following: at least one preset value, each preset value being an integer pixel greater than or equal to 1, or a width or a height of the current decoding block.

20 Claims, 5 Drawing Sheets

(51) Int. Cl.
    *H04N 19/172*     (2014.01)
    *H04N 19/174*     (2014.01)
    *H04N 19/176*     (2014.01)
    *H04N 19/186*     (2014.01)
    *H04N 19/593*     (2014.01)
    *H04N 19/70*     (2014.01)

(52) U.S. Cl.
    CPC .........  *H04N 19/174* (2014.11); *H04N 19/176* (2014.11); *H04N 19/186* (2014.11); *H04N 19/70* (2014.11)

(56) References Cited

U.S. PATENT DOCUMENTS

| | | | |
|---|---|---|---|
| 8,085,852 | B2 | 12/2011 | Liu et al. |
| 8,238,442 | B2 | 8/2012 | Liu |
| 8,526,495 | B2 | 9/2013 | Liu et al. |
| 9,049,452 | B2 | 6/2015 | Liu et al. |
| 9,363,511 | B2 | 6/2016 | Zhang et al. |
| 9,769,472 | B2 | 9/2017 | Liu et al. |
| 10,136,144 | B2 | 11/2018 | Liu et al. |
| 10,205,968 | B2 | 2/2019 | Liu et al. |
| 10,257,521 | B2 | 4/2019 | Lee et al. |
| 10,397,569 | B2 | 8/2019 | Liu et al. |
| 10,455,231 | B2 | 10/2019 | Xu et al. |
| 10,511,834 | B2 | 12/2019 | Xu et al. |
| 10,542,253 | B2 | 1/2020 | Liu et al. |
| 10,567,752 | B2 | 2/2020 | Zhao et al. |
| 10,575,013 | B2 | 2/2020 | Liu et al. |
| 10,582,195 | B2 | 3/2020 | Liu et al. |
| 10,587,881 | B2 | 3/2020 | Xu et al. |
| 10,587,885 | B2 | 3/2020 | Ye et al. |
| 10,595,019 | B2 | 3/2020 | Chernyak et al. |
| 10,609,384 | B2 | 3/2020 | Chen et al. |
| 10,609,402 | B2 | 3/2020 | Zhao et al. |
| 10,609,403 | B2 | 3/2020 | Xu et al. |
| 10,666,968 | B2 | 5/2020 | Xu et al. |
| 10,820,016 | B2 | 10/2020 | Lin et al. |
| 2017/0094271 | A1 | 3/2017 | Liu et al. |
| 2017/0295376 | A1* | 10/2017 | Lee ...................... H04N 19/513 |

FOREIGN PATENT DOCUMENTS

| | | |
|---|---|---|
| CN | 107483941 A | 12/2017 |
| CN | 112543332 A | 3/2021 |
| CN | 112565749 A | 3/2021 |

OTHER PUBLICATIONS

Feng Zou et al. "CE10: Test 7.1 Constrained run for Intra String Copy", Oct. 24, 2014, Section 1-3, Joint Collaborative Team on Video Coding (JCT-VC) of ITU-T SG 16 WP 3 and ISO/IEC JTC 1/SC 29/WG 11.

Feng Zou et al. "Non-SCCE4: Constrained run for 1D dictionary coding", Jul. 9, 2014, Section 1-4, Joint Collaborative Team on Video Coding (JCT-VC) of ITU-T SG 16 WP 3 and ISO/IEC JTC 1/SC 29/WG 11.

Benjamin Bross et al. "Versatile Video Coding (Draft 2)" , Jul. 10-18, 2018, ISO/IEC JTC1/SC29/WG11 JVET-K1001.

Benjamin Bross et al. "General Video Coding Technology in Responses to the Joint Call for Proposals on Video Compression with Capability beyond HEVC", 2019, vol. 30, No. 5, IEEE Transactions on Circuits and Systems for Video Technology.

Dong Liu et al. "Deep Learning-Based Technology in Responses to the Joint Call for Proposals on Video Compression with Capability beyond HEVC" 2019, IEEE Transactions on Circuits and Systems for Video Technology.

Han Zhu et al. "Residual convolutional neural network based in-loop filter with intra and inter frames processed respectively for AVS3" Jul. 2020, 2020 IEEE International Conference on Multimedia & Expo Workshops (ICMEW), London, UK.

Shan Liu et al. "Joint Temporal-Spatial Bit Allocation for Video Coding With Dependency", Jan. 2005, vol. 15 No. 1, IEEE Transactions on Circuits and Systems for Video Technology.

Rajan Joshi et al. "High Efficiency Video Coding (HEVC) Screen Content Coding: Draft 4", Jun. 19-26, 2015 , ISO/IEC JTC1/SC29/WG11 JCTVC-U1005. Part 1.

Rajan Joshi et al. "High Efficiency Video Coding (HEVC) Screen Content Coding: Draft 4", Jun. 19-26, 2015 , ISO/IEC JTC1/SC29/WG11 JCTVC-U1005. Part 2.

Rajan Joshi et al. "High Efficiency Video Coding (HEVC) Screen Content Coding: Draft 4", Jun. 19-26, 2015 , ISO/IEC JTC1/SC29/WG11 JCTVC-U1005. Part 3.

Shan Liu et al. "Overview of HEVC extensions on screen content coding", vol. 4. 2015, Cambridge University Press.

Rajan Joshi et al. "Screen content coding test model 1 (SCM 1)" , JCTVC-Q1014, Valencia, Spain.

Xiaozhong Xu et al. "Block vector prediction for intra block copying in HEVC screen content coding", p. 273-282, 2015 Data Compression Conference.

Xiaozhong Xu et al. "Intra block copy in Versatile Video Coding with Reference Sample Memory Reuse" ,2019 Picture Coding Symposium (PCS).

Chun-Chi Chen et al. "Screen Content Coding Using Non-Square Intra Block Copy for HEVC", Jul. 2014, 2014 IEEE International Conference on Multimedia and Expo (ICME), Chengdu, China.

Yingbin Wang et al. "Intra Block Copy in AVS3 Video Coding Standard", Jul. 2020, 2020 IEEE International Conference on Multimedia & Expo Workshops (ICMEW), London, UK.

Shan Liu et al. "Nonlinear motion-compensated interpolation for low-bit-rate video", Applications of Digital Image Processing XXIII 4115, 203-213.

Ximin Zhang et al. "Intra mode coding in HEVC standard", p. 1-6, 2012 Visual Communications and Image Processing.

Shan Liu et al. "Bit-depth scalable coding for high dynamic range video", 2008, vol. 6822. Journal of Visual Communication and Image Representation.

Xiaozhong Xu et al. "Intra Block Copy in HEVC Screen Content Coding Extensions" , vol. 6, Issue 4, p. 409-419, IEEE Journal on Emerging and Selected Topics in Circuits and Systems.

Shan Liu et al. "Hybrid global—local motion compensated frame interpolation for low bit rate video coding", p. 58-76, Journal of Visual Communication and Image Representation 14 (1).

* cited by examiner

VIDEO DECODING METHOD, VIDEO ENCODING METHOD, ELECTRONIC DEVICE, AND STORAGE MEDIUM

RELATED APPLICATIONS

This application is a continuation of PCT Application No. PCT/CN2021/107756, filed on Jul. 22, 2021, which in turn claims priority to Chinese Patent Application No. 2020104570902, entitled "VIDEO DECODING METHOD, VIDEO ENCODING METHOD, AND RELATED DEVICE," filed with the China National Intellectual Property Administration on May 26, 2020. The two applications are incorporated by reference in their entirety.

FIELD OF THE TECHNOLOGY

The present disclosure relates to the field of video encoding and decoding technologies, and specifically, to a video decoding method, a video encoding method, an electronic device, and a computer-readable storage medium.

BACKGROUND OF THE DISCLOSURE

On the mobile Internet, data traffic related to image and video applications is increasing day by day, and will increase explosively in the 5G era. This provides a new powerful impetus for accelerated development of picture encoding and decoding technologies. In addition, many challenges that have not been encountered in the past have also been proposed to the picture encoding and decoding technologies. In the 5G era, all things are interconnected, and new Internet pictures generated in various emerging applications are diverse and different. Therefore, it has become an urgent need to study efficient picture codec technologies according to the characteristics of new Internet pictures with diversity and differences.

The amount of video data required to play even a relatively short movie can be quite large, which may create difficulties when data is streamed or transmitted in other manners over a communication network with a limited bandwidth capacity. Therefore, video data is often compressed before being transmitted over modern telecommunication networks. Before transmission, a video compression device encodes the video data using software and/or hardware on the source side, thereby reducing the amount of data required to represent digital video pictures. The compressed data is then received at a destination by a video decompression device that decodes the video data. With limited network resources and the ever-increasing demand for higher video quality, there is a need for improved compression and decompression technologies that increase the picture quality without increasing the bit rate.

SUMMARY

The embodiments of the present disclosure provide a video decoding method, a video encoding method, an electronic device, and a computer-readable storage medium, which allow use of different resolutions for encoding a string length, thereby improving the encoding efficiency of the string length.

Other characteristics and advantages of the present disclosure become apparent from the following detailed description, or may be learned in part through the practice of the present disclosure.

One aspect of the present disclosure provides a video decoding method. The method includes obtaining a bitstream that needs to be decoded, the bitstream that needs to be decoded comprising a current decoding block, the current decoding block using an intra string copy mode, and the current decoding block comprising a current string; determining a string length encoding resolution of the current string; decoding the bitstream that needs to be decoded to obtain an encoded string length corresponding to the current string; and obtaining a string length of the current string according to the string length encoding resolution of the current string and the corresponding encoded string length. The string length encoding resolution of the current string is at least one of the following: at least one preset value, each preset value being an integer pixel greater than or equal to 1, or a width or a height of the current decoding block.

Another aspect of the present disclosure provides a non-transitory computer-readable storage medium, storing a computer program, the program, when executed by a processor, implementing the video decoding method or the video encoding method according to the foregoing embodiments.

An embodiment of the present disclosure provides an electronic device, including: at least one processor; and a storage apparatus, configured to store at least one program, the at least one program, when executed by the at least one processor, causing the at least one processor to implement the video decoding method or the video encoding method according to the foregoing embodiments.

It should be understood that the above descriptions and the following detailed descriptions are merely for exemplary and explanatory purposes, and cannot limit the present disclosure.

BRIEF DESCRIPTION OF THE DRAWINGS

The accompanying drawings herein, which are incorporated in the specification as a part of the specification, show embodiments in accordance with the present disclosure, and together with the specification are used to explain the principle of the present disclosure. The accompanying drawings in the following description show merely some embodiments of the present disclosure, and a person of ordinary skill in the art may still derive other drawings from these accompanying drawings without creative efforts. In the accompanying drawings.

DESCRIPTION OF EMBODIMENTS

Figure 1:
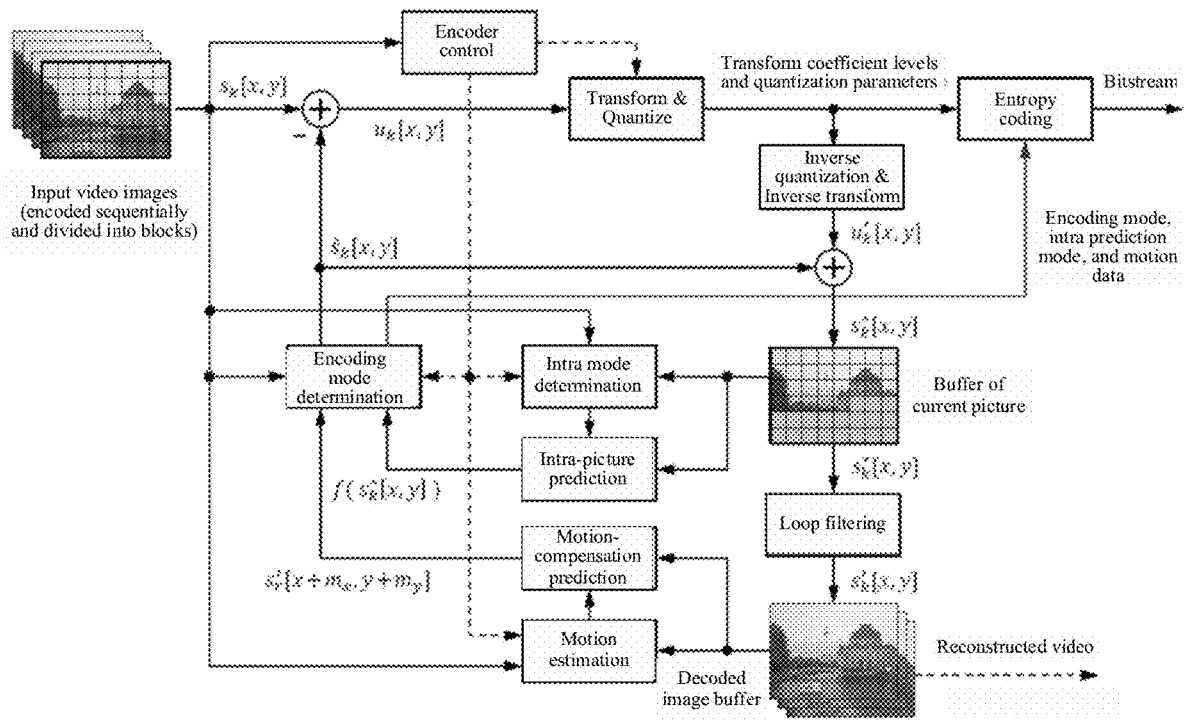
FIG. 1 is a schematic basic block diagram of video encoding in the related art.

Exemplary implementations are now described more comprehensively with reference to the accompanying drawings. However, the examples of implementations may be implemented in various forms, and it should not be understood as being limited to the examples described herein. Conversely, the implementations are provided to make the present disclosure more comprehensive and complete, and comprehensively convey the idea of the examples of the implementations to a person skilled in the art.

In addition, the described features, structures or characteristics may be combined in one or more embodiments in any appropriate manner. In the following descriptions, many specific details are provided to obtain a thorough understanding of the embodiments of the present disclosure. However, a person skilled in the art is to be aware that, the technical solutions of the present disclosure may be implemented without one or more specific details, or another method, component, apparatus, step, and the like may be used. In other cases, well-known methods, apparatuses, implementations, or operations are not shown or described in detail to avoid obscuring aspects of the present disclosure.

The block diagrams shown in the accompanying drawing are merely functional entities and do not necessarily correspond to physically independent entities. That is, the functional entities may be implemented in a software form, or in at least one hardware module or integrated circuit, or in different networks and/or processor apparatuses and/or microcontroller apparatuses.

The flowcharts shown in the accompanying drawings are merely examples for descriptions, do not need to include all content and operations/steps, and do not need to be performed in the described orders either. For example, some operations/steps may be further divided, while some operations/steps may be combined or partially combined. Therefore, an actual execution order may change according to each specific case.

In the string prediction solution (or referred to as the intra string copy technology or the string matching technology) in the related art, 1-pixel resolution is used by default when a string length is encoded (that is, the allowed encoding string length may be 1, 2, 3, or the like), resulting in a higher encoding cost of the string length.

Therefore, there is a need for a new video decoding method, video encoding method, electronic device and computer-readable storage medium.

In the technical solutions provided in some embodiments of the present disclosure, use of different resolutions is allowed to encode a string length, which can improve the encoding efficiency of the string length, thereby improving the overall encoding efficiency of video data. In another aspect, the minimum length of the string can be controlled, and all string lengths are restricted to be integer multiples of a string length encoding resolution, which can increase the granularity of memory access, and is beneficial to hardware implementation.

First, some terms involved in the embodiments of the present disclosure are described.

AVS: Audio Video Coding Standard.
HEVC: High Efficiency Video Coding, or referred to as H.265.
VVC: Versatile Video Coding, Versatile Video Coding, or referred to as H.266.
Intra (picture) Prediction.
Inter (picture) Prediction.
SCC: screen content coding, screen content/picture coding.
Loop Filtering.
QP: Quantization Parameter.
LCU: Largest Coding Unit.
CTU: Coding Tree Unit, generally divided down from the largest coding unit.
CU: Coding Unit.
PU: Prediction Unit.
MV: Motion Vector.
MVP: Motion Vector Prediction, motion vector prediction value.
MVD: Motion Vector Difference, a difference between true valuations of MVP and MV.
AMVP: Advanced Motion Vector Prediction.
ME: Motion Estimation, motion estimation. A process of obtaining a motion vector MV is referred to as motion estimation, which is used as a technology in motion compensation (MC).
MC: It is a process of obtaining an estimated value of a current picture according to the motion vector and the inter prediction method. Motion compensation is a method for describing a difference between adjacent frames (adjacent means adjacent in coding relationship, and two frames are not necessarily adjacent in playback order), specifically for describing how each small block of a previous frame moves to a position in the current frame. This method is often used by video compression/video codecs to reduce spatial redundancy in video sequences. Adjacent frames are usually very similar, that is, contain a lot of redundancy. The purpose of using motion compensation is to improve the compression ratio by removing the redundancy.
BV: Block Vector, block displacement vector/block vector.
BVP: Block Vector Prediction, block vector prediction value.
BVD: Block Vector Difference, a difference between true valuations of BVP and BV.
I Slice: Intra Slice. A picture may be divided into one frame or two fields, and the frame may be divided into one or several slices.
Video signal: From a perspective of an obtaining method f a signal, the obtaining method may include two methods: camera capturing and computer generation. Due to different statistical characteristics of the two methods, corresponding compression coding methods may also be different.

Some video coding technologies, such as HEVC, VVC, and AVS, use a hybrid coding framework. As shown in FIG. 1, pictures in an inputted original video signal are sequentially encoded, and the following series of operations are performed:

1) Block partition structure: An inputted picture is partitioned into a plurality of non-overlapping processing units, and similar compression operations are performed on all the processing units. This processing unit may be referred to as CTU or LCU. The CTU or the LCU may be further partitioned more finely, to obtain at least one basic coding unit, which is referred to as a CU. Each CU is the most basic element in an encoding process. Various possible encoding modes for each CU are described below.

2) Predictive coding: The predictive coding includes modes such as intra prediction and inter prediction. After an original video signal is predicted by using a selected reconstructed video signal, a residual video signal is obtained. An encoding side needs to select a most suitable one for a current CU from many possible predictive coding modes, and informs a decoding side.
   a. Intra prediction: A predicted signal comes from a region in a same picture that has been encoded and reconstructed.

The basic idea of intra prediction is to use the correlation of adjacent pixels to remove spatial redundancy. In video coding, adjacent pixels refer to reconstructed pixels of a coded CU surrounding the current CU.

b. Inter prediction: A predicted signal comes from another picture (referred to as a reference picture) that has been encoded and that is different from a current picture.

3) Transform & Quantization: A residual video signal is transformed into a transform domain through a transform operation such as discrete fourier transform (DFT) or discrete cosine transform (DCT), to generate a transform coefficient. A lossy quantization operation is further performed on the residual video signal in the transform domain, which loses a specific amount of information, so that the quantized signal is conducive to compressed expression.

In some video coding standards, there may be at least one transform manner for selection. Therefore, an encoding side also needs to select one of the transform manners for a current to-be-encoded CU, and inform a decoding side.

The fineness of quantization usually depends on a quantization parameter (QP). A lager value of the QP represents that transform coefficients within a larger range are to be quantized as a same output, and therefore, may usually bring a larger distortion and a lower bit rate. Conversely, a smaller value of the QP represents that coefficients within a smaller range will be quantized as a same output, and therefore, may usually bring a smaller distortion while corresponding to a higher bit rate.

4) Entropy coding or statistical coding: Statistical compression coding is performed quantized transform domain signals according to frequencies of occurrence of values, and finally, a binarized (0 or 1) compressed bitstream is outputted.

In addition, entropy coding also needs to be performed other information, such as a selected coding mode and a motion vector, generated through encoding, to reduce a bit rate.

Statistical coding is a lossless coding mode that can effectively reduce a bit rate required for expressing a same signal. Common statistical coding modes include Variable Length Coding (VLC) or Content Adaptive Binary Arithmetic Coding (CABAC).

5) Loop filtering: Operations of inverse quantization, inverse transform, and prediction compensation (reverse operations of the foregoing steps 2) to 4)) are performed on an picture that has been encoded, to obtain a reconstructed decoded picture. Compared with an original input picture, a reconstructed decoded picture has some information different from that of the original input picture due to impact of quantization, resulting in distortion. A degree of distortion generated through quantization can be effectively reduced by performing a filtering operation on the reconstructed decoded picture using filters such as deblocking, a sample adaptive offset (SAO), or an adaptive loop filter (ALF). Because the filtered reconstructed decoded picture is used as a reference for subsequently encoding an picture and is used for predicting a future signal, the foregoing filtering operation is also referred to as loop filtering, that is, a filtering operation in an encoding loop.

FIG. 1 shows the basic flowchart of a video encoder. FIG. 1 takes a $k^{th}$ CU (marked as $s_k[x, y]$) as an example for illustration. k is a positive integer greater than or equal to 1 and less than or equal to a quantity of CUs in an inputted current picture, $s_k[x, y]$ indicates a pixel with coordinates [x, y] in the $k^{th}$ CU, x indicates a horizontal coordinate of the pixel, and y indicates a vertical coordinate of the pixel. After one of motion compensation or intra prediction is preferably performed on $s_k[x, y]$, a prediction signal $\hat{s}_k[x, y]$ is obtained. A residual signal $u_k[x, y]$ is obtained by subtracting $\hat{s}_k[x, y]$ from $s_k[x, y]$. The residual signal $u_k[x, y]$ is then transformed and quantized. The quantized output data has two different applications. In one application, the quantized output data is sent to an entropy encoder for entropy coding, and an encoded bitstream is outputted to a buffer for storage and waiting to be sent out. In another application, a signal $u'_k[x, y]$ is obtained after inverse quantization and inverse transformation are performed on the quantized output data. A new prediction signal $s^*_k[x, y]$ is obtained by summing the signal $u'_k[x, y]$ and $\hat{s}_k[x, y]$, and $s^*_k[x, y]$ is sent to the buffer of the current picture for storage. $s'_k[x, y]$ is obtained by performing intra-picture prediction on $s^*_k[x, y]$. $s'_k[x, y]$ is obtained by performing loop filtering on $s^*_k[x, y]$. $s'_k[x, y]$ is sent to a buffer of a decoded picture and saved for use in generating a reconstructed video. $s'_r[x+m_x, y+m_y]$ is obtained by performing motion-compensation prediction on $s'_k[x, y]$. $s'_r[x+m_x, y+m_y]$ represents a reference block, and $m_x$ and $m_y$ represent horizontal and vertical components of the motion vector respectively.

Some video coding standards, such as HEVC, VVC, and AVS3, all adopt a block-based hybrid coding framework, divide original video data into a series of encoding blocks, and combine video encoding methods such as prediction, transform, and entropy coding to realize the compression of video data. The motion compensation is a type of prediction method commonly used in video coding. Based on the redundancy characteristics of video content in the temporal or spatial domain, motion compensation derives a prediction value of the current encoding block from a coded region. Such prediction methods include inter prediction, intra block copy prediction, intra string copy prediction, and the like. In a specific coding implementation, these prediction methods may be used alone or in combination. For encoding blocks using these prediction methods, at least one two-dimensional displacement vector needs to be explicitly or implicitly encoded in a bitstream, indicating displacement of the current block (or a co-located block of the current block) relative to at least one reference block thereof.

In different prediction modes and different implementations, the displacement vector may have different names, which are uniformly described in the embodiments of the present disclosure in the following manner: 1) A displacement vector in inter prediction is referred to as a motion vector (MV); 2) A displacement vector in intra block copy is referred to as block vector or block displacement vector (BV); and 3) A displacement vector in intra string copy is referred to as a string vector (SV).

The related technologies in inter prediction and intra block copy prediction are described below.

Figure 2:
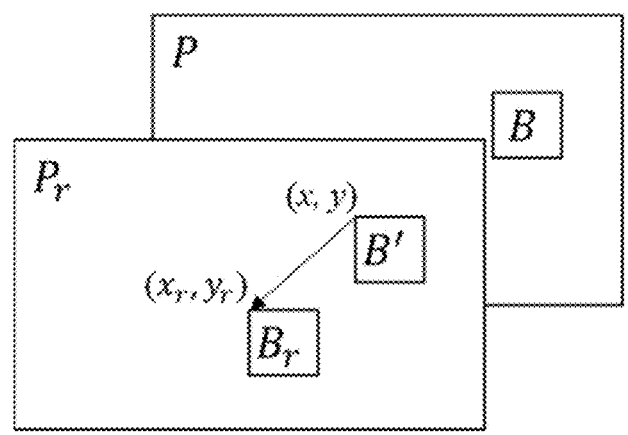
FIG. 2 is a schematic diagram of inter prediction in the related art.

FIG. 2 is a schematic diagram of inter prediction in the related art.

As shown in FIG. 2, the inter prediction is to predict a pixel of the current picture by using correlation of time domain of the video and using a pixel of an adjacent encoded picture, so that the time domain of the video is not redundant, which can effectively save bits of encoded residual data. P is a current frame, $P_r$ is a reference frame, B is a current to-be-encoded block, and $B_r$ is a reference block of B. B' has the same coordinate position as B in the picture.

It is assumed that coordinates of $B_r$ are $(x_r, y_r)$, and coordinates of B' are $(x, y)$. The displacement between the current to-be-encoded block B and the reference block $B_r$ is referred to as a motion vector (MV), that is:

$$MV=(x_r-x, y_r-y) \quad (1)$$

Considering the strong correlation between adjacent blocks in temporal or spatial domains, the MV prediction technology can be used to further reduce the bits required to encode the MV. In H.265/HEVC, inter prediction includes two MV prediction technologies of Merge and AMVP.

The merge mode builds a MV candidate list for the current PU, in which there are five candidate MVs (and corresponding reference pictures). The five candidate MVs are traversed, and a MV with the smallest rate-distortion cost is selected as the optimal MV. If the codec builds the MV candidate list in the same manner, the encoder only needs to transmit an index of the optimal MV in the MV candidate list.

The MV prediction technology of HEVC also has a skip mode, which is a special case of the merge mode. After the optimal MV is found in the merge mode, if the current to-be-encoded block is basically the same as the reference block, there is no need to transmit residual data, only the index of the MV and a skip flag (a flag indicating whether the encoding is in the skip mode) need to be transmitted.

The MV candidate list established by the merge mode includes two cases of a spatial domain and a time domain.

Figure 3:
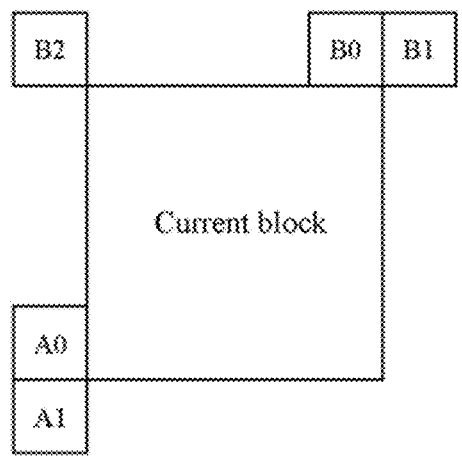
FIG. 3 is a schematic diagram of positions of candidate MVPs in a spatial domain of a merge mode of inter prediction in the related art.

The spatial domain provides up to four candidate MVs, and establishment thereof is shown in FIG. 3. The MV candidate list of the current block in the spatial domain is established in an order of A1→B1→B0→A0→B2, where B2 is a substitute. That is, when at least one of A1, B1, B0, or A0 does not exist, motion information of B2 needs to be used. That is, the size of the MV candidate list is 5, but at most four thereof are used in HEVC (even if all five exist). When one MV is unavailable, the next one is used in order.

Figure 4:
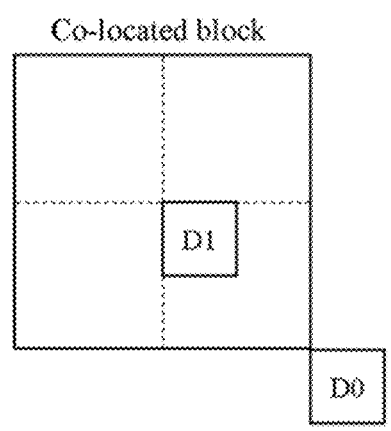
FIG. 4 is a schematic diagram of positions of candidate MVPs in a time domain of a merge mode of inter prediction in the related art.

Compared to the spatial domain which uses adjacent blocks, the time domain uses the MV of the co-located (corresponding position) PU of the adjacent frame to infer the MV of the current position. The time domain only provides one candidate MV at most, and establishment thereof is shown in FIG. 4. An inter prediction picture needs to have a reference picture. For example, the B frame refers to a picture before. The current picture is referred to as cur, the reference picture of the current picture is referred to as cur_ref, the co-located picture of the current picture is referred to as col, and the reference picture of the co-located picture is referred to as col_ref. It is assumed that a distance between the co-located picture col and the reference picture col_ref is tb, and a distance between the current picture cur and its reference picture cur_ref is td. In a specific implementation, tb may be a difference between picture order counts (POCs) of the co-located picture and the reference picture thereof, and td may be a difference between POCs of the current picture and the reference picture thereof, which may be obtained by scaling the MV of the co-located PU according to the following formula:

$$curMV=td*colMV/tb \quad (2)$$

curMV and colMV represent the MVs of the current PU and the co-located PU respectively, so that the MV of the current picture can be derived from the col (co-located) picture. If the PU at the D0 position on the co-located block is unavailable, the co-located PU at the D1 position is used for replacement.

The MV candidate list established by the Merge mode includes the foregoing two cases of the spatial domain and the time domain. For the B slice, a manner of combining lists is further included. The B frame is a frame that needs to refer to a forward frame MV and a backward frame MV, and has two MV lists of list0 and list. Therefore, for a PU in the B slice, since there are two MVs, the MV candidate list also needs to provide two MVPs. HEVC generates a combined list for the B slice by combining the first four candidate MVs in the MV candidate list in pairs.

In the merge mode mentioned above, the MVP is directly used as a MV. The AMVP mode, similar to the merge mode, uses the MV correlation of the adjacent blocks in the spatial and temporal domains to first build a candidate prediction MV list for the current PU. AMVP may use the correlation of motion vectors in space and time to establish a spatial candidate list and a temporal candidate list respectively, and then select a final MVP from the candidate list. Different from the Merge mode, in the AMVP mode, the most predicted MV is selected from the candidate prediction MV list, namely MVP, and performs differential coding with the optimal MV (that is, a real MV) obtained through motion search by the current to-be-encoded block, that is, the encoded MVD=MV−MVP. By establishing the same list, the decoding side only needs the sequence numbers of the MVD and the MVP in the list to calculate the MV of the current decoding block. The AMVP candidate prediction MV list also includes the two cases of the spatial domain and the time domain, and the difference is that the length of the AMVP list is only 2.

As described above, in the AMVP mode of HEVC, MVD needs to be encoded. In HEVC, the resolution of MVD is controlled by use_integer_mv_flag in slice_header (slice header or slice data header). When the value of this flag is 0, MVD is encoded with a ¼ (brightness) pixel resolution; and when the value of this flag is 1, the MVD is encoded with an integer (brightness) pixel resolution.

A method of adaptive motion vector resolution (AMVR) is used in VVC. This method allows each CU to adaptively select a resolution of the coded MVD. In the normal AMVP mode, selectable resolutions include ¼, ½, 1, and 4 pixels. For a CU with at least one non-zero MVD component, a flag is first encoded to indicate whether quarter luma sample MVD precision is used for the CU. If this flag is 0, the MVD of the current CU is coded at the ¼-pixel resolution. Otherwise, a second flag needs to be encoded to indicate that the ½-pixel resolution or another MVD resolution is used by the CU. Otherwise, a third flag is encoded to indicate whether to use the 1-pixel resolution or the 4-pixel resolution for the CU. In the Affine AMVP mode, selectable resolutions include ¹⁄₁₆ pixel, ¼ (brightness) pixel, and 1 pixel.

Screen pictures are pictures generated by electronic devices such as computers, mobile phones, and TVs, and mainly contain two types of content: one of which is computer-generated non-continuous-tone content, including a large quantity of small and sharp line shapes, such as text, icons, buttons, and grids; the other of which is camera-shot content that contains a lot of continuous tone, such as movies, TV clips, and natural picture videos. The video coding standards of the block-based hybrid coding method in the related art, such as AVS and HEVC, have a high compression ratio for natural pictures and videos containing a large amount of continuous content, but have poor compression effect for screen pictures containing non-continuous tone content.

With the rapid development of cloud computing, mobile communication technologies, and wireless display technologies, how to display high-quality screen pictures on various electronic terminal devices at low bit rates is a problem that SCC needs to solve. To improve the performance of screen picture encoding, the SCC version of the HEVC standard is developed, and some tools that are beneficial to screen picture encoding are adopted, such as intra block copy (IBC).

IBC is an intra coding tool adopted in the HEVC screen content coding (SCC) extension, which significantly improves the coding efficiency of screen content. In AVS3, VVC, the IBC technology is also adopted to improve the performance of screen content encoding. IBC utilizes the spatial correlation of screen content and videos, and uses the encoded picture pixels on the current picture to predict the pixels of the current to-be-encoded block (referred to as the current block in FIG. 5), which can effectively save the bits required for encoding pixels.

Figure 5:
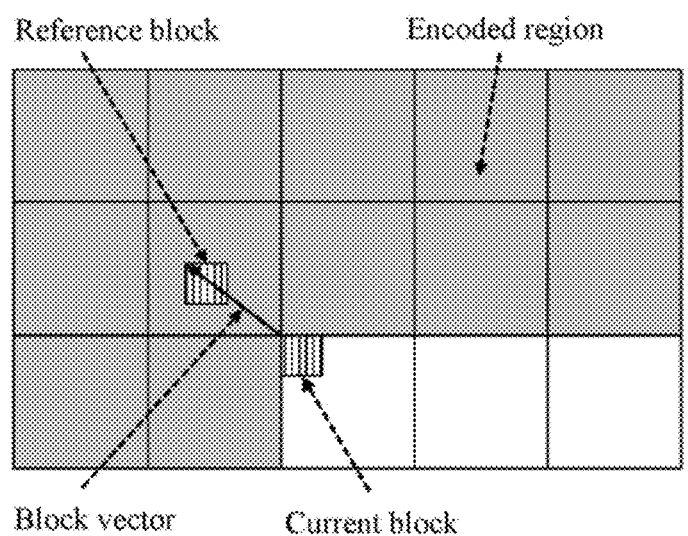
FIG. 5 is a schematic diagram of intra block copy in the related art.

As shown in FIG. 5, the displacement between a current block and a reference block thereof in IBC is referred to as a block vector (BV). VVC uses the AMVP mode similar to inter prediction to predict the BV, and allows encoding BVD using 1 or 4-pixel resolution.

The intra string copy (ISC)/string prediction technology can better improve the screen picture coding effect, which converts a two-dimensional picture into one-dimensional coding unit CU one by one. The ISC divides an encoding block into a series of pixel strings or unmatched pixels according to some scan orders (raster scan, round trip scan, zig-zag scan, and the like). Similar to the IBC, each string looks for a reference string of the same shape in an encoded region of the current picture, derives a prediction value of the current string, and encodes a residual between a pixel value of the current string and the prediction value instead of directly encoding the pixel value, which can effectively save bits.

Figure 6:
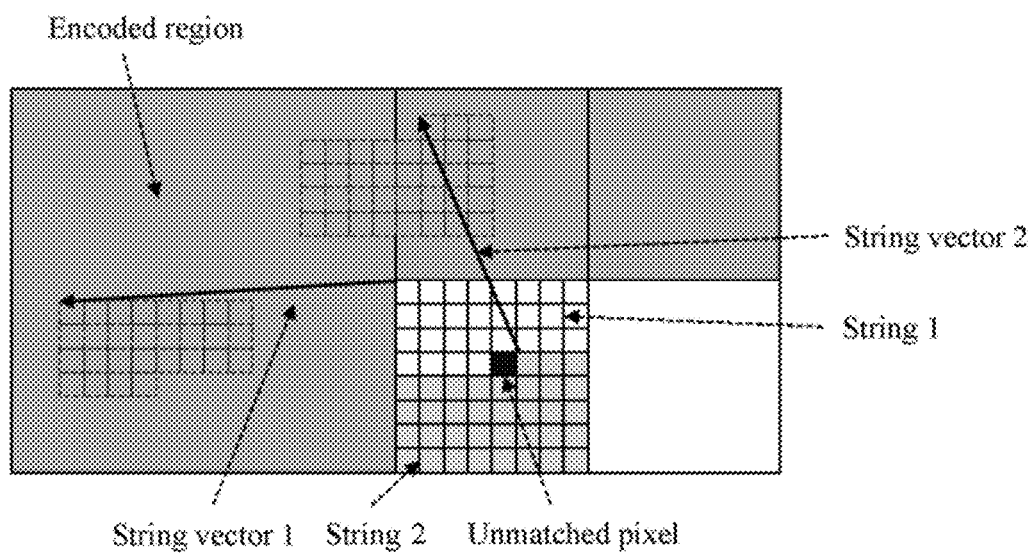
FIG. 6 is a schematic diagram of intra string copy in the related art.

FIG. 6 is a schematic diagram of intra string copy. The dark region is an encoded region, 28 white pixels represent a string 1, 35 light pixels represent a string 2, and one black pixel represents an unmatched pixel. If a pixel does not find a corresponding reference in a referenceable region, the pixel is referred to as an unmatched pixel, or referred to as an outlier. A pixel value of the unmatched pixel is directly encoded, rather than derived from the prediction value of the reference string.

The ISC technology needs to encode a string vector (SV) corresponding to each string in the current encoding block, a string length, and a flag of whether there is a matching reference string. The string vector (SV) represents the displacement of a to-be-encoded string (a current string, that is, a current to-be-encoded string) to a reference string thereof. The string length indicates a quantity of pixels contained in the to-be-encoded string.

At the AVS standards conference in March 2020, the ISC technology was adopted into the reference software. In the current ISC solution, 1-pixel resolution is used by default when a string length is encoded (that is, the allowed encoding string length may be 1, 2, 3, or the like), resulting in a higher encoding cost of the string length. An embodiment of the present disclosure provides a video encoding method, which allows use of different resolutions for encoding a string length, thereby improving the encoding efficiency of the string length. An embodiment of the present disclosure further provides a video decoding method, which can improve the decoding efficiency of a string length when decoding a bitstream that uses different resolutions to encode the string length.

The methods provided in the embodiments of the present disclosure may be applied to video codecs or video compression products using ISC, and may be applied to encoding and decoding of lossy data compression, and may be further applied to encoding and decoding of lossless data compression. The data involved in the encoding and decoding process refers to one or a combination of the following examples:

1) One-dimensional data;
2) Two-dimensional data;
3) Multidimensional data;
4) Graphics;
5) Pictures;
6) Sequence of pictures;
7) Videos;
8) Three-dimensional scene;
9) Sequence of continuously changing three-dimensional scenes;
10) Virtual reality scene;
11) Sequence of continuously changing virtual reality scenes;
12) Picture in the pixel form;
13) Transform domain data of picture;
14) Collection of two-dimensional or at least two-dimensional bytes;
15) Collection of two-dimensional or at least two-dimensional bits;
16) Collection of pixels;
17) Collection of three-component pixels (Y, U, V);
18) Collection of three-component pixels (Y, Cb, Cr);
19) Collection of three-component pixels (Y, Cg, Co);
20) Collection of three-component pixels (R, G, B);
21) Collection of four-component pixels (C, M, Y, K);
22) Collection of four-component pixels (R, G, B, A);
23) Collection of four-component pixels (Y, U, V, A);
24) Collection of four-component pixels (Y, Cb, Cr, A);
25) Collection of four-component pixels (Y, Cg, Co, A).

When data is an picture, a sequence of pictures, or a video listed above, an encoding block is an encoding region of the picture, and includes at least one of the following: a group of pictures, a predetermined quantity of pictures, a picture, a frame of picture, an picture of a field, a sub-picture of a picture, a slice, a macroblock, an LCU, a CTU, or a CU.

Figure 7:
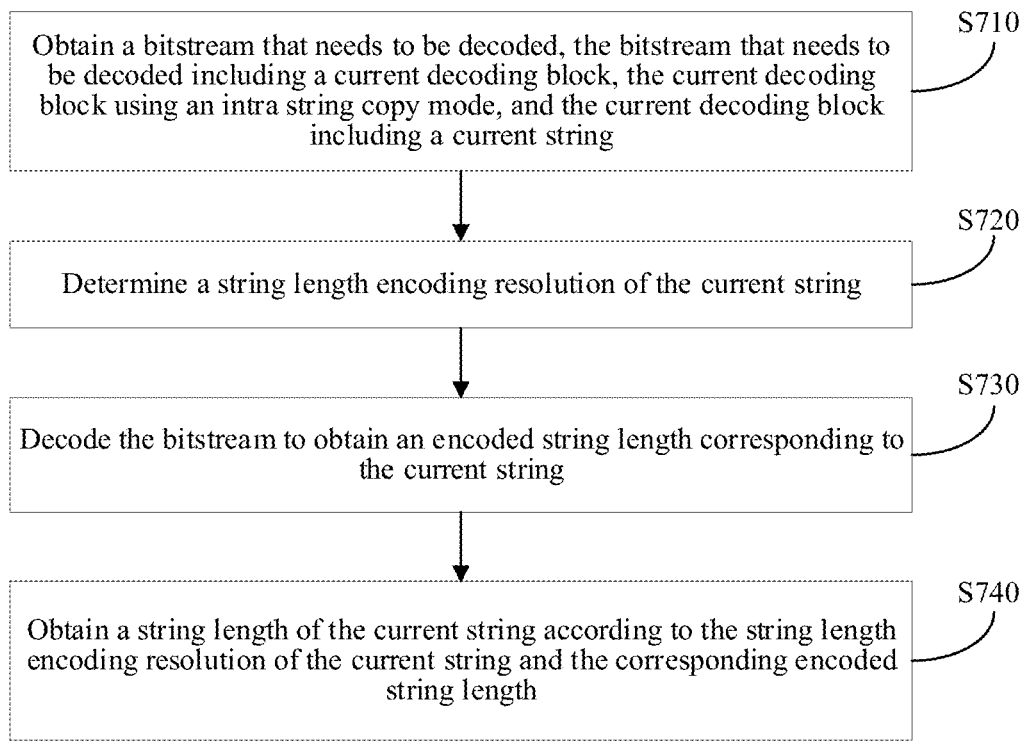
FIG. 7 is a schematic diagram of a video decoding method according to an embodiment of the present disclosure.

FIG. 7 is a schematic diagram of a video decoding method according to an embodiment of the present disclosure. The embodiment of FIG. 7 is described by taking a decoding side as an example. As shown in FIG. 7, the method provided in the embodiments of the present disclosure may include the following steps.

Step S710: Obtain a bitstream that needs to be decoded, the bitstream that needs to be decoded including a current decoding block, the current decoding block using an intra string copy mode, and the current decoding block including a current string.

In this embodiment of the present disclosure, when the encoding side encodes an encoding block, the encoding block is a sub-picture, which includes at least one of the following: a CU, a PU, or a TU. In the following illustration, the CU is used as an example for illustration, but the present disclosure is not limited thereto. The pixels in the encoding block are encoded in the intra string copy mode, and the corresponding reference string is represented by SV and/or string length to obtain a prediction value of the current pixel through a predetermined operation, that is, an encoding information compressed data bitstream of the ISC is generated and transmitted to the decoding side as a bitstream that needs to be decoded at the decoding side.

The decoding side parses the foregoing bitstream that needs to be decoded, obtains information indicating that the encoding block adopts the ISC, and uses the ISC to decode the pixels in the current decoding block (the current to-be-decoded block). The current string is a string currently to be decoded in the current decoding block.

S720: Determine a string length encoding resolution of the current string.

The string length encoding resolution of the current string is at least one of the following: at least one preset value, each preset value being an integer pixel greater than or equal to 1; or a width or a height of the current decoding block.

In this embodiment of the present disclosure, at the decoding side, the current CU corresponds to the current decoding block; and at the encoding side, the current CU corresponds to the current encoding block.

In one embodiment, the at least one preset value may include one integer pixel, two integer pixels, or four integer pixels. However, the present disclosure is not limited thereto.

For example, assuming that the size of the current encoding block is 8×8, the value range of the string length is [1, 64]. If the string length is encoded in the default fixed-length encoding manner in the foregoing related art, in the case of 1-pixel resolution, 6 bits are required. However, in the case of adopting the 4-pixel resolution provided in this embodiment of the present disclosure, only 4 bits are required. In addition, the solutions provided in the embodiments of the present disclosure can further control the minimum length of strings, for example, restricting all string lengths to be integer multiples of 4, which increases the granularity of memory access and is beneficial to hardware implementation.

In this embodiment of the present disclosure, a restriction is added to the ISC: the value of the allowable encoded string length is an integer multiple of N, where N is a positive integer, and is referred to as the basic unit of the string length. N may also be referred to as string length encoding resolution or string length resolution (SLR).

In this embodiment of the present disclosure, the range of N may be set as follows:

a) The basic unit N of the string length may be at least one preset value, such as one, two, or four integer pixels. In video coding standards, "pixels" may also use the expression "samples".

b) The basic unit N of the string length is the width or height of the current CU.

For example, if the index is decoded for each CU, for a block of size 8×8, N takes the value of 8 integer pixels; and for a block of 8×16, N may take a value of 8 or 16 integer pixels.

In another example, if an picture header (or a slice header, a sequence header, or the like whose control range is greater than a CU flag) is used to decode the index, N is set according to a block size allowed by the encoder/encoding side.

c) The basic unit N of the string length is determined according to a scanning direction used by the current CU.

For example, when a scanning mode along the horizontal direction (referred to as horizontal scanning, which, for example, may include raster-scan and traverse-scan) is used, a CU block width is used as the basic unit N; and when a scanning mode along the vertical direction (referred to as vertical scanning, which, for example, may include raster-scan and traverse-scan) is used, a CU block height is used as the basic unit N.

The foregoing three manners a), b), and c) of obtaining the value can all bring benefits, and the pros and cons can be determined according to the coding performance and hardware implementation. At the encoding side, for a specific current string, one or more combinations thereof are selected.

At the encoding side, there are two processes of searching for the optimal string length of the current string and encoding the optimal string length of the current string. When the solutions provided in the embodiments of the present disclosure are used, string lengths to be encoded are all integer multiples of N. For example, in the case of N=1, the encoding side first analyzes and divides the 8×8 block into two strings with lengths of 23 and 41 respectively, and then encodes 23 and 41. In the case of N=4, the encoding side analyzes to obtain different string quantities and string lengths (the values of the string lengths are all integer multiples of N), and then encodes the string length.

Generally, a larger value of N indicates fewer bits that need to be encoded for the string length and larger granularity of memory access, which is more conducive to hardware implementation (also considering the issue of byte alignment). However, when N becomes larger, the manner in which the encoding block is divided into strings is limited. For example, a block of 8×8 can achieve better coding performance when divided into string lengths of 23 and 41. After limiting N=4, this division cannot be achieved.

In one embodiment, the determining a string length encoding resolution of the current string may include: determining, when the string length encoding resolution of the current string is the width or the height of the current decoding block, a scanning mode used by a current encoding block corresponding to the current decoding block when the intra string copy mode is used; and determining the string length encoding resolution of the current string according to the scanning mode.

In one embodiment, the determining the string length encoding resolution of the current string according to the scanning mode may include: determining that the string length encoding resolution of the current string is the width of the current decoding block when the scanning mode is horizontal scanning; and determining that the string length encoding resolution of the current string is the height of the current decoding block when the scanning mode is vertical scanning.

In one embodiment, the determining a string length encoding resolution of the current string may include: setting a string length encoding resolution of all strings as a first target preset value, where the first target preset value is any one of the at least one preset value.

In one embodiment, a sequence header of a video sequence corresponding to the bitstream that needs to be decoded includes a first string length encoding resolution index, and the first string length encoding resolution index indicates a string length encoding resolution of strings in the video sequence. The determining a string length encoding resolution of the current string may include decoding the first string length encoding resolution index in the sequence header to obtain the string length encoding resolution of the strings in the video sequence, where the strings in the video sequence include the current string.

In one embodiment, an picture header of a current picture corresponding to the current decoding block includes a second string length encoding resolution index, and the second string length encoding resolution index indicates a string length encoding resolution of strings in the current picture. The determining a string length encoding resolution of the current string may include decoding the second string length encoding resolution index in the picture header to obtain the string length encoding resolution of the strings in the current picture, where the strings in the current picture include the current string.

In one embodiment, a slice header of a current slice corresponding to the current decoding block includes a third string length encoding resolution index, and the third string length encoding resolution index indicates a string length encoding resolution of strings in the current slice. The determining a string length encoding resolution of the current string may include decoding the third string length encoding resolution index in the slice header to obtain the string length encoding resolution of the strings in the current slice, where the strings in the current slice include the current string.

In one embodiment, the bitstream that needs to be decoded may include a largest coding unit corresponding to the current decoding block and a fourth string length encoding resolution index of the current decoding block, and the fourth string length encoding resolution index indicates a string length encoding resolution of strings in the largest coding unit corresponding to the current decoding block. The determining a string length encoding resolution of the current string may include decoding the fourth string length encoding resolution index to obtain the string length encoding resolution of the strings in the largest coding unit corresponding to the current decoding block, where the strings in the largest coding unit corresponding to the current decoding block include the current string.

In one embodiment, the bitstream that needs to be decoded may include a fifth string length encoding resolution index of the current decoding block, and the fifth string length encoding resolution index indicates a string length encoding resolution of strings in the current decoding block. The determining a string length encoding resolution of the current string may include decoding the fifth string length encoding resolution index to obtain the string length encoding resolution of the strings in the current decoding block, where the strings in the current decoding block include the current string.

In one embodiment, the bitstream that needs to be decoded may include a sixth string length encoding resolution index of the current string, and the sixth string length encoding resolution index indicates the string length encoding resolution of the current string. The determining a string length encoding resolution of the current string may include decoding the sixth string length encoding resolution index to obtain the string length encoding resolution of the current string.

In one embodiment, the determining a string length encoding resolution of the current string may include: obtaining a size of the current decoding block; and determining the string length encoding resolution of the current string according to the size of the current decoding block.

In one embodiment, the size of the current decoding block may include an area of the current decoding block, and the area of the current decoding block is equal to a product of the width and the height of the current decoding block.

In one embodiment, the determining the string length encoding resolution of the current string according to the size of the current decoding block may include: determining that the string length encoding resolution of the current string is one integer pixel when the area of the current decoding block is less than or equal to a first preset threshold (for example, any of 16, 32, or the like); or determining that the string length encoding resolution of the current string is one integer pixel when the width of the current decoding block is less than or equal to a second preset threshold (for example, any of 4, 8, or the like) and the height of the current decoding block is less than or equal to a third preset threshold (for example, any of 4, 8, or the like).

In one embodiment, the determining the string length encoding resolution of the current string according to the size of the current decoding block may further include: determining that the string length encoding resolution of the current string is two integer pixels when the area of the current decoding block is greater than the first preset threshold; or determining that the string length encoding resolution of the current string is two integer pixels when the width of the current decoding block is greater than the second preset threshold and the height of the current decoding block is greater than the third preset threshold.

In one embodiment, the determining a string length encoding resolution of the current string may include: obtaining a format of a video sequence corresponding to the bitstream that needs to be decoded; and determining string length encoding resolutions of corresponding channel components of the current string according to the format of the video sequence.

In one embodiment, the determining string length encoding resolutions of corresponding channel components of the current string according to the format of the video sequence may include: determining, when the format of the video sequence is YUV4:2:0, that the corresponding channel components of the current string include a brightness component and a chrominance component; determining that a string length encoding resolution of the brightness component of the current string is four integer pixels; and determining that a string length encoding resolution of the chrominance component of the current string is two integer pixels.

In one embodiment, the determining a string length encoding resolution of the current string may include: obtaining a decoded string quantity of the current decoding block; and determining that the string length encoding resolution of the current string is a second target preset value when the decoded string quantity is greater than or equal to a decoded string threshold, where the second target preset value is any one of the at least one preset value.

In one embodiment, the decoded string threshold may be 1, 2, or 3.

In one embodiment, the method may further include: obtaining a size of the current decoding block; and setting the decoded string threshold according to the size of the current decoding block.

In one embodiment, the determining a string length encoding resolution of the current string may include: obtaining a decoded unmatched pixel quantity of the current decoding block; and determining that the string length encoding resolution of the current string is a third target preset value when the decoded unmatched pixel quantity is greater than or equal to a decoded unmatched pixel threshold, where the third target preset value is any one of the at least one preset value.

In one embodiment, the determining a string length encoding resolution of the current string may include: obtaining a remaining pixel quantity of the current decoding block including the current string; and determining that the string length encoding resolution of the current string is a fourth target preset value when the remaining pixel quantity is less than or equal to a remaining pixel threshold, where the fourth target preset value is any one of the at least one preset value.

In one embodiment, a value range of the remaining pixel threshold is greater than or equal to 1 and less than or equal to a size of the current decoding block.

In one embodiment, the determining a string length encoding resolution of the current string may include: obtaining a remaining pixel quantity of the current decoding block including the current string; and determining the string length encoding resolution of the current string according to the remaining pixel quantity.

In one embodiment, the at least one preset value may include a first preset value (for example, one integer pixel), a second preset value (for example, two integer pixels), and a third preset value (for example, four integer pixels), the first preset value is less than the second preset value, and the second preset value is less than the third preset value. The determining the string length encoding resolution of the current string according to the remaining pixel quantity may include: determining that the string length encoding resolution of the current string is any one of the first preset value, the second preset value, or the third preset value when the remaining pixel quantity is greater than or equal to a first remaining threshold; determining that the string length encoding resolution of the current string is any one of the first preset value or the second preset value when the remaining pixel quantity is less than the first remaining threshold and greater than or equal to a second remaining threshold; and determining that the string length encoding resolution of the current string is the first preset value when the remaining pixel quantity is less than the second remaining threshold and greater than or equal to a third remaining threshold, where the first remaining threshold is greater than the second remaining threshold, and the second remaining threshold is greater than the third remaining threshold.

In one embodiment, the encoded string length corresponding to the current string may include an encoded string length of the current string. The obtaining a string length of the current string according to the string length encoding resolution of the current string and the corresponding encoded string length may include obtaining the string length of the current string according to the string length encoding resolution of the current string and the encoded string length of the current string.

In this embodiment of the present disclosure, the encoding side may analyze which string length encoding resolution is the best for each string. When there are a plurality of values for SLR or N, an index may be encoded at the encoding side to indicate which one is selected for the current string, and the encoded index is put into the encoding information compressed data bitstream and transmitted to the decoding side as information in the bitstream that needs to be decoded. The decoding side determines the SLR of the current string, and may adopt one or a combination of the following manners:

a) SLRS of all strings are any one of the at least one preset value.

At the encoding side, according to the impact on encoding performance and hardware, at least one of the foregoing at least one preset value may be selected as a first target preset value, and the SLRs of all strings may be determined as the first target preset value.

b) An index (which may be referred to as a first string length encoding resolution index) is decoded in the sequence header, indicating the SLRs of all strings in the video sequence corresponding to the sequence header.

The range of N is given in the foregoing embodiment, when the allowable string length is {1, 2, 4} integer pixels, if the decoded index is 0, it means that the SLR is 1 integer pixel; if the decoded index is 1, it means that the SLR is 2 integer pixels; and if the decoded index is 2, it means that the SLR is 4 integer pixels.

c) An index (which may be referred to as a second string length encoding resolution index) is decoded in the picture header, indicating the SLRs of all strings in the current picture corresponding to the picture header.

d) An index (which may be referred to as a third string length encoding resolution index) is decoded in the slice header, indicating the SLRs of all strings in the slice corresponding to the slice header.

e) An index (which may be referred to as a fourth string length encoding resolution index) is decoded for each largest coding unit (LCU), indicating the SLRs of all strings in the each LCU.

f) If a prediction mode of the current CU is ISC, an index (which may be referred to as a fifth string length encoding resolution index) is decoded for the current CU, indicating the SLRs of all strings in the current CU.

g) If the prediction mode of the current CU is ISC, an index (which may be referred to as a sixth string length encoding resolution index) is decoded for each string, indicating an SLR of each string.

h) N may be selected for different blocks in combination with the size of the decoding block.

For example, assuming that the allowed string length encoding resolution is {1, 2} integer pixels, for a block of 4×4, N=1 may be set; for a block of 16×16, N=2 may be set; and for a block with an area (width×height) greater than 128, N=2 may be set, and so on.

i) N may be selected in combination with color components.

For example, in a video in YUV4:2:0 format, if a string length encoding resolution of a brightness component is determined to be N=4, a string length coding resolution of a chrominance component may be set to N=2.

j) Assuming that a decoded string quantity of the current CU is N_S1 (an integer greater than or equal to 0), if N_S1 is greater than or equal to a preset decoded string threshold, the SLR may be set to any one of the foregoing at least one preset value.

For example, N_S1 may be 1, 2, or 3, but the present disclosure is not limited thereto.

In another example, the value of N_S1 may be determined according to the size of the current CU. For example, if the size of the current CU is W*H, N_S1=W*H/8 may be set, but the present disclosure is not limited thereto.

The performance complexity of different decoded string thresholds is different and may be selected as needed.

k) Assuming that a decoded unmatched pixel quantity of the current CU is N_S2 (an integer greater than or equal to 0), if N_S2 is greater than or equal to a preset decoded unmatched pixel threshold, the SLR may be set to any one of the foregoing at least one preset value.

l) If a remaining pixel quantity of the current CU (the remaining pixel quantity includes a pixel quantity of the current string, that is, in the current CU whose prediction mode is ISC, the pixels are decoded in the scanning order, and pixels that are not decoded are referred to as "remaining pixels") is less than or equal to a remaining pixel threshold T, the SLR may be directly set to any one of the foregoing at least one preset value.

In this embodiment of the present disclosure, the value range of the remaining pixel threshold T may be [1, the pixel quantity of the current CU], and the pixel quantity of the current CU is the size of the current decoding block.

Assuming that the allowable SLR is {1, 4} integer pixels, the remaining pixel threshold T=8, the remaining pixel quantity is small (for example, less than the remaining pixel threshold 8), and the benefit of setting N=4 is small, N=1 is directly set. For example, if the remaining pixel quantity is 3, N does not take a value of 4 integer pixels, and N=1 integer pixel is directly set.

In this embodiment of the present disclosure, the selectable range of the SLR may be further adjusted according to decoded pixel quantity, and the first to-be-decoded pixel quantity is obtained by subtracting 1 from an undecoded pixel quantity of the current decoding block except for the current string after encoding according to a string length resolution of the current string. The obtaining a string length of the current string according to the string length encoding resolution of the current string and the corresponding encoded string length may include: obtaining a size of the current decoding block; obtaining a decoded pixel quantity of the current decoding block; obtaining the undecoded pixel quantity of the current decoding block except for the current string according to the first to-be-decoded pixel quantity and the string length resolution of the current string; and obtaining the string length of the current string according to the size of the current decoding block, the decoded pixel quantity, and the undecoded pixel quantity.

```
In the related art, the decoding process of the ISC is as follows:
sp_flag //decoded string prediction flag
if(SpFlag) {
    sp_dir_flag // decode scanning direction flag: 0 represents the vertical direction,
1 represents the horizontal direction,
    while (CurPixel < TotalPixel) {
        sp_is_matched_flag // decode whether match the flag, and it may be
determined that the type of the next remaining pixel belongs to 0 represents unmatched pixel, and 1
represents string
        if(SpIsMatchedFlag)
        {
            sp_special_len_flag // decode whether the flag of the last string: 0
represents not the last string, and 1 represents the last string
            if(SpSpecialLenFlag)
            {
                SpLength = width * height - CurPixel // The string length does
not need to be decoded, and may be derived by calculation: obtained by subtracting the size of the
current CU (width represents the width of the current CU, and height represents the height of the
current CU) from a decoded string length (CurPixel);
            }
            else{
            {
                next_remaining_pixel_minus1 // decode remaining pixels minus
1
                SpLength = width * height - CurPixel -
NextRemainingPixelMinus1 - 1 // export a string length
            }
            decode_sv( ) // decode the string vector, and the specific process is
omitted herein
            CurPixel += SpLength;
        }
        else{
        {
            decode_pixel( ) // decode the pixel value of the unmatched pixel, and
the specific process is omitted herein
            CurPixel += 1;
        }
    }
}
``` the remaining pixel quantity. For example, when the remaining pixel quantity>=32 (the first remaining threshold), the SLR may be {1, 2, 4} integer pixels; when the remaining pixel quantity>=8 (the second remaining threshold), the SLR may be {1, 2} integer pixels; and when the remaining pixel quantity>=4 (the third remaining threshold), the SLR is {1} integer pixel.

S730: Decode the bitstream that needs to be decoded to obtain an encoded string length corresponding to the current string.

S740: Obtain a string length of the current string according to the string length encoding resolution of the current string and the corresponding encoded string length.

In one embodiment, the encoded string length corresponding to the current string may include a first to-be- In the foregoing decoding process, a field with "_" represents a syntax element to be decoded, a field without "_" whose first letter is capitalized represents a variable, and the value of the variable may be obtained by decoding the syntax element. Some details irrelevant to the embodiments of the present disclosure are omitted from the foregoing process.

According to the foregoing decoding process, what is decoded in the decoding process is the remaining pixel quantity minus 1. Therefore, in this embodiment of the present disclosure, the first to-be-decoded pixel quantity is obtained by subtracting 1 from an undecoded pixel quantity of the current decoding block except for the current string after encoding according to a string length resolution of the current string. That is, if the string length is 0, the string length does not need to be encoded. Therefore, 1 is subtracted from the encoded string length to obtain better encoding or decoding performance.

In one embodiment, the encoded string length corresponding to the current string may include a second to-be-decoded pixel quantity, and the second to-be-decoded pixel quantity is obtained by encoding an undecoded pixel quantity of the current decoding block except for the current string according to a string length resolution of the current string. The obtaining a string length of the current string according to the string length encoding resolution of the current string and the corresponding encoded string length may include: obtaining a size of the current decoding block; obtaining a decoded pixel quantity of the current decoding block; obtaining the undecoded pixel quantity of the current decoding block except for the current string according to the second to-be-decoded pixel quantity and the string length resolution of the current string; and obtaining the string length of the current string according to the size of the current decoding block, the decoded pixel quantity, and the undecoded pixel quantity.

In one embodiment, the method may further include: decoding the bitstream that needs to be decoded to obtain a target identifier; obtaining a size of the current decoding block and a decoded pixel quantity of the current decoding block when the target identifier indicates that the current string is a last string in the current decoding block; and obtaining the string length of the current string according to the size of the current decoding block and the decoded pixel quantity of the current decoding block.

In this embodiment of the present disclosure, the string length L (L is a positive integer greater than 1) of the current string derived from the bitstream that needs to be decoded is one or a combination of the following manners:

a) Decode the bitstream that needs to be decoded to obtain an encoded string length L0 of the current string, and derive $L=L0*N$.

b) is another implementation of step a). After decoding from the bitstream that needs to be decoded, the string length L of the current string may be deduced.

For example, if "the remaining pixel quantity after processing the current string minus 1 (that is, the first to-be-decoded pixel quantity)" is decoded from the bitstream that needs to be decoded, and is recorded as M0, where M0 is an integer greater than or equal to 0. $M1=(M0+1)*N$ is calculated according to the SLR, where M1 is an undecoded pixel quantity of the current decoding block excluding the current string, and M1 is an integer greater than or equal to 0. According to the size M of the current decoding block (which may be represented by height*width of the current decoding block), assuming that the decoded pixel quantity of the current decoding block is M2, and M2 is an integer greater than or equal to 0, the decoding side may calculate the string length of the current string $L=M-M1-M2$.

In another example, if "the remaining pixel quantity after processing the current string (that is, the second to-be-decoded pixel quantity)" is decoded from the bitstream that needs to be decoded, and is recorded as N0, where N0 is an integer greater than or equal to 0. $M1=N0*N$ is calculated according to the SLR, where M1 is an undecoded pixel quantity of the current decoding block excluding the current string. Assuming that the decoded pixel quantity of the current decoding block is M2, the decoding side may calculate the string length of the current string $L=M-M1-M2$ according to the size M of the current decoding block.

c) Encode a target identifier for example, sp_special_len_flag in the foregoing decoding process) in the bitstream that needs to be decoded to indicate whether the current string is the last string in the current decoding block. If the current string is the last string, according to the size M of the current decoding block and decoded pixel quantity M2 of the current decoding block, the string length $L=M-M2$ of the current string is calculated.

In one embodiment, the current decoding block may further include a unmatched pixel that needs to be decoded. The method may further include: determining a pixel value encoding resolution of the unmatched pixel that needs to be decoded; decoding the bitstream that needs to be decoded to obtain an encoded pixel value of the unmatched pixel that needs to be decoded; and obtaining a pixel value of the unmatched pixel that needs to be decoded according to the pixel value encoding resolution and the encoded pixel value.

In one embodiment, the pixel value encoding resolution of the unmatched pixel that needs to be decoded may be equal to the string length encoding resolution of the current string.

In one embodiment, the pixel value encoding resolution of the unmatched pixel that needs to be decoded is any one of the at least one preset value.

In one embodiment, the basic unit of the unmatched pixel may be alternatively set to N. For example, if N=4, it means that the pixel value of the unmatched pixel appears as an integer multiple of a length of 4. The basic unit N of the unmatched pixel may be any one of the foregoing at least one preset value; or the string length encoding resolution SLR of the same string length.

In one embodiment, the current decoding block further includes a unmatched pixel that needs to be decoded. The method further includes: determining an encoding resolution of the unmatched pixel that needs to be decoded; and decoding a pixel value of at least one unmatched pixel that needs to be decoded corresponding to the encoding resolution from the bitstream that needs to be decoded when a matching identifier obtained by decoding the bitstream that needs to be decoded is a first value.

In one embodiment, an encoding resolution of a unmatched pixel that needs to be decoded is equal to the string length encoding resolution of the current string; or an encoding resolution of a unmatched pixel that needs to be decoded is any one of the at least one preset value.

Specifically, the unmatched pixel that needs to be decoded in the bitstream that needs to be decoded may be restricted to appear in an integer multiple of length N. Referring to the foregoing decoding process, when sp_is_matched_flag is decoded as a first value such as 0, the pixel value of the unmatched pixel that needs to be decoded is decoded. For example, assuming N=4, pixel values of four unmatched pixels that need to be decoded may be decoded.

Figure 8:
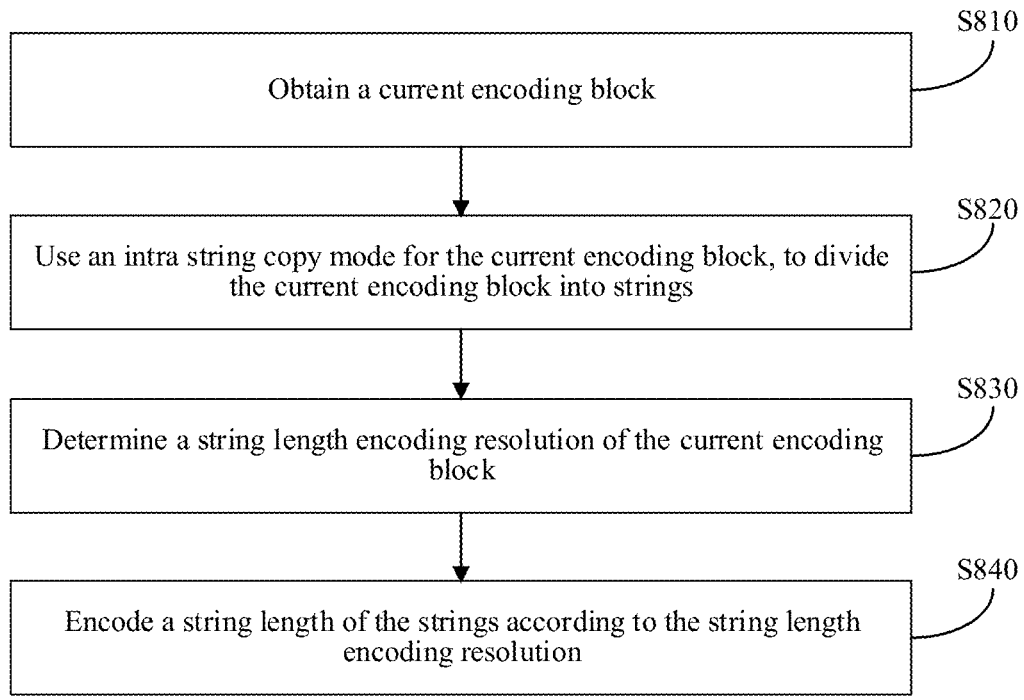
FIG. 8 is a schematic diagram of a video encoding method according to an embodiment of the present disclosure.

FIG. 8 is a schematic diagram of a video decoding method according to an embodiment of the present disclosure. The embodiment of FIG. 8 is described by taking an encoding side as an example. As shown in FIG. 8, the method provided in the embodiments of the present disclosure may include the following steps.

S810: Obtain a current encoding block.

In this embodiment of the present disclosure, the current encoding block may be a sub-picture in the sequentially encoded current picture in the original video sequence to be encoded, and includes at least one of the following: a CU, a PU, or a TU. In the following illustration, the CU is used as an example for illustration, but the present disclosure is not limited thereto. Assuming that the optimal encoding mode of the current encoding block, for example, the current CU, is ISC, a syntax element corresponding to the ISC is encoded.

S820: Use an intra string copy mode for the current encoding block, to divide the current encoding block into strings.

All pixels in the current CU are searched for a matching reference string according to a specific scanning order, where the scanning order may be horizontal or vertical, or other orders. Since ISC is to search for a matching reference string for the pixels in the current CU in a one-dimensional dictionary (one-dimensional search cache), the pixels of the current CU need to be reordered (converted from the two-dimensional format to the one-dimensional format) according to a predetermined horizontal scanning order before searching and stored in the dictionary. The historical pixel data saved in the dictionary, that is, the reconstructed pixels of the encoded CU, is reordered in the horizontal scanning order.

The search cache is the dictionary, which is used for matching reference string search in the encoder/encoding side, and used for matching reference string reconstruction in the decoder. Any reconstructed pixel of the encoded CU may be used to search for the pixels of the current CU.

The dictionary described above is only one of the implementations, and the present disclosure is not limited thereto. For example, a reference pixel that matches the next to-be-processed pixel of the current ISC block may be directly found in the current encoded region. Whether the next pixel is within a preset threshold range is sequentially calculated according to the scanning order, thereby obtaining a string.

S830: Determine a string length encoding resolution of the current encoding block.

The string length encoding resolution is at least one of the following: at least one preset value, each preset value being an integer pixel greater than or equal to 1; or a width or a height of the current encoding block.

In some embodiments, the current encoding block may be divided into strings first, and a string length encoding resolution may be determined according to a string length. Specifically, the current encoding block may be first divided into a series of strings, and according to a string length of each string, a string length encoding resolution may be set to a maximum value that can divide the corresponding string length. One current encoding block may contain a variety of different string length encoding resolutions.

In some embodiments, alternatively, the string length encoding resolution may be determined first, and then the current encoding block is divided into strings according to the string length encoding resolution.

In this embodiment of the present disclosure, when the ISC is used to encode the current CU, a restriction is added to the ISC: the value of the allowable encoded string length is an integer multiple of N, where N is a positive integer, and is referred to as the basic unit of the string length. N may also be referred to as string length encoding resolution or string length resolution (SLR).

In this embodiment of the present disclosure, the range of N may be set as follows:
 a) The basic unit N of the string length may be at least one preset value, such as one, two, or four integer pixels. In video coding standards, "pixels" may also use the expression "samples".
 b) The basic unit N of the string length is the width or height of the current CU.

For example, if the index is decoded for each CU, for a block of size 8×8, N takes the value of 8 integer pixels; and for a block of 8×16, N may take a value of 8 or 16 integer pixels.

In another example, if an picture header (or a slice header, a sequence header, or the like whose control range is greater than a CU flag) is used to decode the index, N is set according to a block size allowed by the encoder/encoding side.
 c) The basic unit N of the string length is determined according to a scanning direction used by the current CU.

For example, when a scanning mode along the horizontal direction (referred to as horizontal scanning, which, for example, may include raster-scan and traverse-scan) is used, a CU block width is used as the basic unit N; and when a scanning mode along the vertical direction (referred to as vertical scanning, which, for example, may include raster-scan and traverse-scan) is used, a CU block height is used as the basic unit N.

The foregoing three manners a), b), and c) of obtaining the value can all bring benefits, and the pros and cons can be determined according to the coding performance and hardware implementation. At the encoding side, for a specific current string, one or more combinations thereof are selected.

S840: Encode a string length of the strings according to the string length encoding resolution.

In HEVC encoding including ISC, according to the CU adaptive manner, after each inputted CU is encoded by inter-frame, intra-frame, IBC, and ISC, an encoding mode with the smallest rate distortion cost (RD cost) is selected through a rate distortion optimized selection mechanism of HEVC. An encoding result is put in a bitstream. The ISC encoding process may be as follows: 1) Take a CU as a unit, and for pixels in the CU, search for a matching reference string as long as possible in the search buffer. The horizontal direction search is performed, and then the vertical direction search is performed. The minimum value of the string length L of the string is 1, and the maximum value is a sum of the pixels in the CU. 2) If a matching reference string is found, save the string length L and a matching position P; and if no matching reference string is found within the search range, the current pixel is saved and referred to as an unmatched pixel Pix. 3) Update a hash table and continue the search from the pixel at the next position. 4) After the entire CU search is completed, perform entropy coding on search results, that is, perform entropy coding on a search order (horizontal or vertical), (P, L), and Pix, and perform HEVC mode selection according to the RD cost.

The corresponding ISC decoding process: 1) Perform entropy decoding on the bitstream to obtain the search order and syntax elements such as (P, L) and Pix. 2) In the rebuild cache, restore the current CU according to the foregoing syntax elements. That is, if there is a matching reference string, according to the matching position P, a corresponding position is found in the reconstructed cache, and according to the search order, the corresponding pixel is copied to the current position according to the string length L. If there is no matching reference string, the unmatched pixel Pix obtained by decoding is directly filled into the current position.

The hash table-based search may be used to achieve fast search. The hash value is calculated according to the YUV component of each pixel, the position of the pixel in the picture is stored in the hash table, and a zipper hash method is used to deal with the hash conflict. During searching, the search position may be obtained from the corresponding chain in the hash table according to the hash value of the current pixel, and matching tried, to obtain a next search position from the chain. The matching is continuously tried until an optimal match is found, or no match is found within a limited quantity of searches.

The ISC bitstream generated by entropy coding may include the following syntax elements: matching identifier (indicating whether a matching reference string is searched in the search cache), unmatched pixel (Pix), matching position P, string length L, octuplet identifier (eight most recently used distance values are stored in an array and referred to as an octuplet), and octuplet index (0-7). The syntax elements are entropy encoded.

The binarization of the matching identifier, the octuplet identifier, and the octuplet index may all use fixed length (FL) encoding, which are, for example, FL(1), FL(1), and FL(3) respectively.

The string length L represents the length of the matching reference string, and the value range is 1–the size of the current encoding block, for example, 64*64.

Further, an embodiment of the present disclosure further provides a video decoding apparatus. The apparatus may include: a bitstream that needs to be decoded obtaining unit, which may be configured to obtain a bitstream that needs to be decoded, where the bitstream that needs to be decoded may include a current decoding block, the current decoding block uses an intra string copy mode, and the current decoding block may include a current string; an encoding resolution determining unit, which may be configured to determine a string length encoding resolution of the current string; a bitstream decoding unit, which may be configured to decode the bitstream that needs to be decoded to obtain an encoded string length corresponding to the current string; and a string length obtaining unit, which may be configured to obtain a string length of the current string according to the string length encoding resolution of the current string and the corresponding encoded string length. The string length encoding resolution of the current string may be at least one of the following: at least one preset value, each preset value being an integer pixel greater than or equal to 1; or a width or a height of the current decoding block.

In one embodiment, the at least one preset value may include one integer pixel, two integer pixels, or four integer pixels.

In one embodiment, the encoding resolution determining unit may include: a scanning mode determining unit, which may be configured to determine, when the string length encoding resolution of the current string is the width or the height of the current decoding block, a scanning mode used by a current encoding block corresponding to the current decoding block when the intra string copy mode is used; and a string length resolution determining unit, which may be configured to determine the string length encoding resolution of the current string according to the scanning mode.

In one embodiment, the string length resolution determining unit may include: a horizontal string length resolution determining unit, which may be configured to determine that the string length encoding resolution of the current string is the width of the current decoding block when the scanning mode is horizontal scanning; and a vertical string length resolution determining unit, which may be configured to determine that the string length encoding resolution of the current string is the height of the current decoding block when the scanning mode is vertical scanning.

In one embodiment, the encoding resolution determining unit may include: a first string length resolution preset unit, which may be configured to set a string length encoding resolution of all strings as a first target preset value, where the first target preset value is any one of the at least one preset value.

In one embodiment, a sequence header of a video sequence corresponding to the bitstream that needs to be decoded may include a first string length encoding resolution index, and the first string length encoding resolution index indicates a string length encoding resolution of strings in the video sequence. The encoding resolution determining unit may include a first index decoding unit, which may be configured to decode the first string length encoding resolution index in the sequence header to obtain the string length encoding resolution of the strings in the video sequence. The strings in the video sequence include the current string.

In one embodiment, an picture header of a current picture corresponding to the current decoding block includes a second string length encoding resolution index, and the second string length encoding resolution index indicates a string length encoding resolution of strings in the current picture. The encoding resolution determining unit may include a second index decoding unit, which may be configured to decode the second string length encoding resolution index in the picture header to obtain the string length encoding resolution of the strings in the current picture. The strings in the current picture include the current string.

In one embodiment, a slice header of a current slice corresponding to the current decoding block may include a third string length encoding resolution index, and the third string length encoding resolution index indicates a string length encoding resolution of strings in the current slice. The encoding resolution determining unit may include a third index decoding unit, which may be configured to decode the third string length encoding resolution index in the slice header to obtain the string length encoding resolution of the strings in the current slice. The strings in the current slice include the current string.

In one embodiment, the bitstream that needs to be decoded may include a largest coding unit corresponding to the current decoding block and a fourth string length encoding resolution index of the current decoding block, and the fourth string length encoding resolution index indicates a string length encoding resolution of strings in the largest coding unit corresponding to the current decoding block. The encoding resolution determining unit may include a fourth index decoding unit, which may be configured to decode the fourth string length encoding resolution index to obtain the string length encoding resolution of the strings in the largest coding unit corresponding to the current decoding block. The strings in the largest coding unit corresponding to the current decoding block include the current string.

In one embodiment, the bitstream that needs to be decoded may include a fifth string length encoding resolution index of the current decoding block, and the fifth string length encoding resolution index indicates a string length encoding resolution of strings in the current decoding block. The encoding resolution determining unit may include a fifth index decoding unit, which may be configured to decode the fifth string length encoding resolution index to obtain the string length encoding resolution of the strings in the current decoding block. The strings in the current decoding block include the current string.

In one embodiment, the bitstream that needs to be decoded may include a sixth string length encoding resolution index of the current string, and the sixth string length encoding resolution index indicates the string length encoding resolution of the current string. The encoding resolution determining unit may include a sixth index decoding unit, which may be configured to decode the sixth string length encoding resolution index to obtain the string length encoding resolution of the current string.

In one embodiment, the encoding resolution determining unit may include: a decoding block size obtaining unit, which may be configured to obtain a size of the current decoding block; and a string length encoding resolution obtaining unit, which may be configured to determine the string length encoding resolution of the current string according to the size of the current decoding block.

In one embodiment, the size of the current decoding block may include an area of the current decoding block, and the area of the current decoding block is equal to a product of the width and the height of the current decoding block.

In one embodiment, the string length encoding resolution obtaining unit may include a first string length encoding resolution obtaining unit, which may be configured to determine that the string length encoding resolution of the current string is one integer pixel when the area of the current decoding block is less than or equal to a first preset threshold; or determine that the string length encoding resolution of the current string is one integer pixel when the width of the current decoding block is less than or equal to a second preset threshold and the height of the current decoding block is less than or equal to a third preset threshold.

In one embodiment, the string length encoding resolution obtaining unit may further include a second string length encoding resolution obtaining unit, which may be configured to determine that the string length encoding resolution of the current string is two integer pixels when the area of the current decoding block is greater than the first preset threshold; or determine that the string length encoding resolution of the current string is two integer pixels when the width of the current decoding block is greater than the second preset threshold and the height of the current decoding block is greater than the third preset threshold.

In one embodiment, the encoding resolution determining unit may include: a video format obtaining unit, which may be configured to obtain a format of a video sequence corresponding to the bitstream that needs to be decoded; and a channel component string length encoding resolution determining unit, which may be configured to determine string length encoding resolutions of corresponding channel components of the current string according to the format of the video sequence.

In one embodiment, the channel component string length encoding resolution determining unit may include: a channel component determining unit, which may be configured to determine, when the format of the video sequence is YUV4:2:0, that the corresponding channel components of the current string include a brightness component and a chrominance component; a brightness component string length resolution determining unit, which may be configured to determine that a string length encoding resolution of the brightness component of the current string is four integer pixels; and a chrominance component string length resolution determining unit, which may be configured to determine that a string length encoding resolution of the chrominance component of the current string is two integer pixels.

In one embodiment, the encoding resolution determining unit may include: a decoded string quantity obtaining unit, which may be configured to obtain a decoded string quantity of the current decoding block; and a second string length resolution preset unit, which may be configured to determine that the string length encoding resolution of the current string is a second target preset value when the decoded string quantity is greater than or equal to a decoded string threshold, where the second target preset value is any one of the at least one preset value.

In one embodiment, the decoded string threshold may be 1, 2, or 3.

In one embodiment, the apparatus may further include: a decoding block size obtaining unit, which may be configured to obtain a size of the current decoding block; and a decoded string threshold setting unit, which may be configured to set the decoded string threshold according to the size of the current decoding block.

In one embodiment, the encoding resolution determining unit may include: a decoded unmatched pixel quantity obtaining unit, which may be configured to obtain a decoded unmatched pixel quantity of the current decoding block; and a third string length resolution preset unit, which may be configured to determine that the string length encoding resolution of the current string is a third target preset value when the decoded unmatched pixel quantity is greater than or equal to a decoded unmatched pixel threshold, where the third target preset value is any one of the at least one preset value.

In one embodiment, the encoding resolution determining unit may include: a first remaining pixel quantity obtaining unit, which may be configured to obtain a remaining pixel quantity of the current decoding block including the current string; and a fourth string length resolution preset unit, which may be configured to determine that the string length encoding resolution of the current string is a fourth target preset value when the remaining pixel quantity is less than or equal to a remaining pixel threshold, where the fourth target preset value is any one of the at least one preset value.

In one embodiment, a value range of the remaining pixel threshold is greater than or equal to 1 and less than or equal to a size of the current decoding block.

In one embodiment, the encoding resolution determining unit may include: a second remaining pixel quantity obtaining unit, which may be configured to obtain a remaining pixel quantity of the current decoding block including the current string; and a string length resolution adjustment unit, which may be configured to determine the string length encoding resolution of the current string according to the remaining pixel quantity.

In one embodiment, the at least one preset value may include a first preset value, a second preset value, and a third preset value, the first preset value is less than the second preset value, and the second preset value is less than the third preset value. The string length resolution adjustment unit may include: a first resolution selection range adjustment unit, which may be configured to determine that the string length encoding resolution of the current string is any one of the first preset value, the second preset value, or the third preset value when the remaining pixel quantity is greater than or equal to a first remaining threshold; a second resolution selection range adjustment unit, which may be configured to determine that the string length encoding resolution of the current string is any one of the first preset value or the second preset value when the remaining pixel quantity is less than the first remaining threshold and greater than or equal to a second remaining threshold; and a third resolution selection range adjustment unit, which may be configured to determine the string length encoding resolution of the current string is the first preset value when the remaining pixel quantity is less than the second remaining threshold and greater than or equal to a third remaining threshold. The first remaining threshold is greater than the second remaining threshold, and the second remaining threshold is greater than the third remaining threshold.

In one embodiment, the encoded string length corresponding to the current string includes an encoded string length of the current string. The string length obtaining unit may include a first string length calculation unit, which may be configured to obtain the string length of the current string according to the string length encoding resolution of the current string and the encoded string length of the current string.

In one embodiment, the encoded string length corresponding to the current string may include a first to-be-decoded pixel quantity, and the first to-be-decoded pixel quantity is obtained by subtracting 1 from an undecoded pixel quantity of the current decoding block except for the current string after encoding according to a string length resolution of the current string. The string length obtaining unit may include: a decoding block size determining unit, which may be configured to obtain a size of the current decoding block; a first decoded pixel quantity obtaining unit, which may be configured to obtain a decoded pixel quantity of the current decoding block; a first undecoded pixel quantity obtaining unit, which may be configured to obtain the undecoded pixel quantity of the current decoding block except for the current string according to the first to-be-decoded pixel quantity and the string length resolution of the current string; and a second string length calculation unit, which may be configured to obtain the string length of the current string according to the size of the current decoding block, the decoded pixel quantity, and the undecoded pixel quantity.

In one embodiment, the encoded string length corresponding to the current string may include a second to-be-decoded pixel quantity, and the second to-be-decoded pixel quantity is obtained by encoding an undecoded pixel quantity of the current decoding block except for the current string according to a string length resolution of the current string. The string length obtaining unit may include: a decoding block size obtaining unit, which may be configured to obtain a size of the current decoding block; a second decoded pixel quantity obtaining unit, which may be configured to obtain a decoded pixel quantity of the current decoding block; a second undecoded pixel quantity obtaining unit, which may be configured to obtain the undecoded pixel quantity of the current decoding block except for the current string according to the second to-be-decoded pixel quantity and the string length resolution of the current string; and a third string length calculation unit, which may be configured to obtain the string length of the current string according to the size of the current decoding block, the decoded pixel quantity, and the undecoded pixel quantity.

In one embodiment, the apparatus may further include: a target identifier obtaining unit, which may be configured to decode the bitstream that needs to be decoded to obtain a target identifier; a decoding block information obtaining unit, which may be configured to obtain a size of the current decoding block and a decoded pixel quantity of the current decoding block when the target identifier indicates that the current string is a last string in the current decoding block; and a fourth string length calculation unit, which may be configured to obtain the string length of the current string according to the size of the current decoding block and the decoded pixel quantity of the current decoding block.

In one embodiment, the current decoding block may further include a unmatched pixel that needs to be decoded. The apparatus may further include: an unmatched pixel resolution determining unit, which may be configured to determine a pixel value encoding resolution of the unmatched pixel that needs to be decoded; an encoded pixel value obtaining unit, which may be configured to decode the bitstream that needs to be decoded to obtain an encoded pixel value of the unmatched pixel that needs to be decoded; and an unmatched pixel value obtaining unit, which may be configured to obtain a pixel value of the unmatched pixel that needs to be decoded according to the pixel value encoding resolution and the encoded pixel value.

In one embodiment, the pixel value encoding resolution of the unmatched pixel that needs to be decoded may be equal to the string length encoding resolution of the current string.

In one embodiment, the pixel value encoding resolution of the unmatched pixel that needs to be decoded may be any one of the at least one preset value.

In one embodiment, the current decoding block may further include a unmatched pixel that needs to be decoded. The apparatus may further include: an unmatched pixel encoding resolution determining unit, which may be configured to determine an encoding resolution of the unmatched pixel that needs to be decoded; and a resolution unmatched pixel decoding unit, which may be configured to decode a pixel value of at least one unmatched pixel that needs to be decoded corresponding to the encoding resolution from the bitstream that needs to be decoded when a matching identifier obtained by decoding the bitstream that needs to be decoded is a first value.

In one embodiment, an encoding resolution of a unmatched pixel that needs to be decoded is equal to the string length encoding resolution of the current string; or an encoding resolution of a unmatched pixel that needs to be decoded is any one of the at least one preset value.

For the specific implementations of the units in the video decoding apparatus provided in this embodiment of the present disclosure, reference may be made to the content in the foregoing video decoding method, and details are not described herein again.

Further, an embodiment of the present disclosure further provides a video encoding apparatus. The apparatus may include: a current encoding block obtaining unit, which may be configured to obtain a current encoding block; a string division unit, which may be configured to use an intra string copy mode for the current encoding block, to divide the current encoding block into strings; an encoding resolution determining unit, which may be configured to determine a string length encoding resolution of the current encoding block; and a string length encoding unit, which may be configured to encode a string length of the strings according to the string length encoding resolution. The string length encoding resolution may be at least one of the following: at least one preset value, each preset value being an integer pixel greater than or equal to 1; or a width or a height of the current encoding block.

For the specific implementations of the units in the video decoding apparatus provided in this embodiment of the present disclosure, reference may be made to the content in the video decoding method and the video encoding method above, and details are not described herein again.

Although a plurality of units of a device configured to perform actions are discussed in the foregoing detailed description, such division is not mandatory. In fact, according to the implementations of the present disclosure, the features and functions of two or more units described above may be embodied in one unit. On the contrary, the features and functions of one unit described above may be further divided into a plurality of units to be specified.

An embodiment of the present disclosure provides a computer-readable storage medium, storing a computer program, the program, when executed by a processor, implementing the video decoding method according to the foregoing embodiments.

An embodiment of the present disclosure provides a computer-readable storage medium, storing a computer program, the program, when executed by a processor, implementing the video encoding method according to the foregoing embodiments.

An embodiment of the present disclosure provides an electronic device, including at least one processor; and a storage apparatus, configured to store at least one program, the at least one program, when executed by the at least one processor, causing the at least one processor to implement the video decoding method according to the foregoing embodiments.

An embodiment of the present disclosure provides an electronic device, including at least one processor; and a storage apparatus, configured to store at least one program, the at least one program, when executed by the at least one processor, causing the at least one processor to implement the video encoding method according to the foregoing embodiments.

Figure 9:
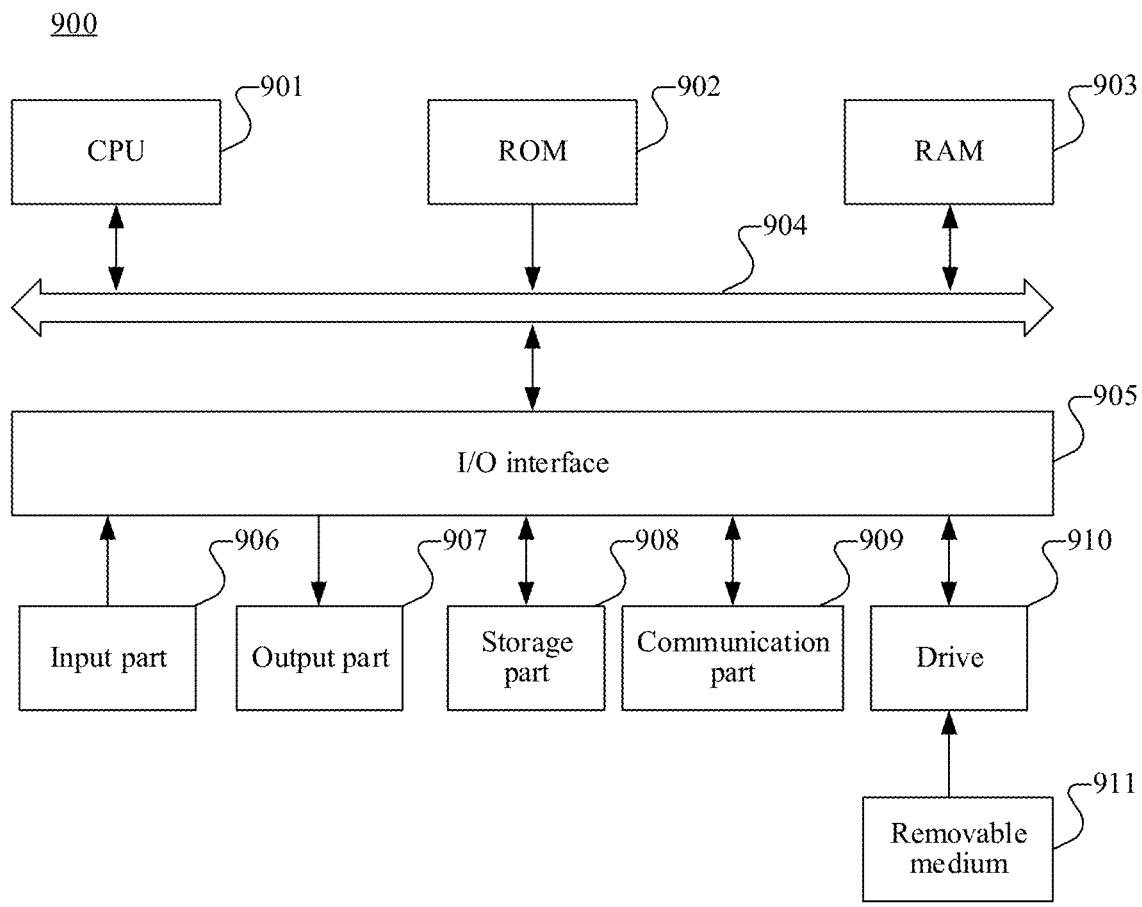
FIG. 9 is a schematic structural diagram of an electronic device implementing the embodiments of the present disclosure.

FIG. 9 is a schematic structural diagram of an electronic device adapted to implement the embodiments of the present disclosure.

An electronic device 900 shown in FIG. 9 is only an example, and does not impose any limitation on the functions and the scope of use of the exemplary embodiments of the present disclosure.

As shown in FIG. 9, the electronic device 900 includes a central processing unit (CPU) 901. The CPU can perform various proper actions and processing according to a program stored in a read-only memory (ROM) 902 or a program loaded from a storage part 908 into a random access memory (RAM) 903. The RAM 903 further stores various programs and data required for system operations. The CPU 901, the ROM 902, and the RAM 903 are connected to each other by using a bus 904. An input/output (I/O) interface 905 is also connected to the bus 904.

The following parts are connected to the I/O interface 905: an input part 906 including a keyboard, a mouse, and the like; an output part 907 including a cathode ray tube (CRT), a liquid crystal display (LCD), or the like, a speaker and the like; a storage part 908 including a hard disk and the like; and a communication part 909 including a network interface card such as a local area network (LAN) card, a modem, or the like. The communication portion 909 performs communication processing by using a network such as the Internet. A driver 910 is also connected to the I/O interface 905 as required. A removable medium 911, such as a magnetic disk, an optical disc, a magneto-optical disk, or a semiconductor memory, is installed on the drive 910 as required, so that a computer program read from the removable medium is installed into the storage part 908 as required.

Particularly, according to an embodiment of the present disclosure, the processes described below by referring to the flowcharts may be implemented as computer software programs. For example, an embodiment of the present disclosure includes a computer program product, including a computer program carried on a computer-readable medium. The computer program includes program code for performing the method shown in the flowchart. In such an embodiment, the computer program may be downloaded and installed from the network through the communication portion 909, and/or installed from the removable medium 911. When the computer program is executed by the CPU 901, various functions defined in the method and/or apparatus of this application are executed.

The computer-readable medium shown in the present disclosure may be a computer-readable signal medium, a computer-readable storage medium, or any combination thereof. The computer-readable storage medium may be, for example, but is not limited to, an electrical, magnetic, optical, electromagnetic, infrared, or semiconductor system, apparatus, or device, or any combination thereof. More specific examples of the computer-readable storage medium may include, but are not limited to, an electrical connection having at least one wire, a portable computer magnetic disk, a hard disk, a RAM, a ROM, an erasable programmable read-only memory (EPROM) (or flash memory), an optical fiber, a compact disk read-only memory (CD-ROM), an optical storage device, a magnetic storage device, or any appropriate combination thereof. In the present disclosure, the computer-readable storage medium may be any tangible medium including or storing a program, and the program may be used by or in combination with an instruction execution system, apparatus, or device. In the present disclosure, the computer-readable signal medium may be a data signal included in a baseband or propagated as a part of a carrier, in which computer-readable program code is carried. The data signal propagated in such a way may assume a plurality of forms, including, but not limited to, an electromagnetic signal, an optical signal, or any appropriate combination thereof. The computer-readable signal medium may alternatively be any computer-readable medium other than the computer-readable storage medium. The computer-readable medium may send, propagate, or transmit a program used by or in combination with an instruction execution system, apparatus, or device. The program code contained in the computer-readable storage medium may be transmitted by using any appropriate medium, including but not limited to a wireless medium, a wire, an optical cable, a radio frequency (RF) medium, or any appropriate combination thereof The flowcharts and block diagrams in the accompanying drawings show architectures, functions, and operations that may be implemented by using the method, the apparatus, and the computer program product according to the embodiments of the present disclosure. In this regard, each box in a flowchart or a block diagram may represent a module, a program segment, or a part of code. The module, the program segment, or the part of code includes at least one executable instruction used for implementing designated logic functions. In some implementations used as substitutes, functions annotated in boxes may alternatively occur in a sequence different from that annotated in an accompanying drawing. For example, two boxes shown in succession may be performed basically in parallel, and sometimes the two boxes may be performed in a reverse sequence. This is determined by a related function. Each box in a block diagram and/or a flowchart and a combination of boxes in the block diagram and/or the flowchart may be implemented by using a dedicated hardware-based system configured to perform a specified function or operation, or may be implemented by using a combination of dedicated hardware and a computer instruction.

The involved units described in the embodiments of the present disclosure may be implemented in a software manner, or may be implemented in a hardware manner, and the described units may also be disposed in a processor. Names of the units do not constitute a limitation on the units in a specific case.

In another aspect, this application further provides a computer-readable storage medium. The computer-readable storage medium may be included in the electronic device described in the above embodiments, or may exist alone without being assembled into the electronic device. The computer-readable storage medium carries one or more programs, the one or more programs, when executed by the electronic device, causing the electronic device to implement the method described in the following embodiments. For example, the electronic device may implement the steps shown in FIG. 7 or FIG. 8.

According to the foregoing descriptions of the implementations, a person skilled in the art may readily understand that the exemplary implementations described herein may be implemented by using software, or may be implemented by combining software and necessary hardware. Therefore, the technical solutions according to the implementations of the present disclosure may be implemented in the form of a software product. The software product may be stored in a non-volatile storage medium (which may be a CD-ROM, a USB flash drive, a removable hard disk, or the like) or a network, and includes several instructions for instructing a computing device (which may be a personal computer, a server, a touch terminal, a network device, or the like) to perform the method according to the implementations of the present disclosure.

After considering the specification and practicing the present disclosure, a person skilled in the art can easily conceive of other implementations of the present disclosure. This application is intended to cover any variation, use, or adaptive change of the present disclosure. These variations, uses, or adaptive changes follow the general principles of the present disclosure and include common general knowledge or common technical means, which are not disclosed in the present disclosure, in the technology. The specification and the embodiments are considered as exemplary only, and a true scope and spirit of the present disclosure are pointed out by the following claims.

It should be understood that the present disclosure is not limited to the precise structures described above and shown in the accompanying drawings, and various modifications and changes can be made without departing from the scope of the present disclosure. The scope of the present disclosure is limited only by the appended claims.

What is claimed is:

1. A video decoding method, comprising:
    obtaining a bitstream that needs to be decoded, the bitstream that needs to be decoded comprising a current decoding block, the current decoding block using an intra string copy mode, and the current decoding block comprising a current string;
    determining a string length encoding resolution of the current string;
    decoding the bitstream that needs to be decoded to obtain an encoded string length corresponding to the current string; and
    obtaining a string length of the current string according to the string length encoding resolution of the current string and the corresponding encoded string length, the string length encoding resolution of the current string being at least one of the following:
        at least one preset value, each preset value being an integer pixel greater than or equal to 1; or
        a width or a height of the current decoding block,
    wherein the current decoding block comprises an unmatched pixel that needs to be decoded, and the method further comprises:
        determining a pixel value encoding resolution of the unmatched pixel that needs to be decoded;
        decoding the bitstream that needs to be decoded to obtain an encoded pixel value of the unmatched pixel that needs to be decoded; and
        obtaining a pixel value of the unmatched pixel that needs to be decoded according to the pixel value encoding resolution and the encoded pixel value.

2. The video decoding method according to claim 1, wherein the at least one preset value comprises one integer pixel, two integer pixels, or four integer pixels.

3. The video decoding method according to claim 1, wherein the determining a string length encoding resolution of the current string comprises:
    determining, if the string length encoding resolution of the current string is the width or the height of the current decoding block, a scanning mode used by a current encoding block corresponding to the current decoding block when the intra string copy mode is used; and
    determining the string length encoding resolution of the current string according to the scanning mode.

4. The video decoding method according to claim 3, wherein the determining the string length encoding resolution of the current string according to the scanning mode comprises:
    determining that the string length encoding resolution of the current string is the width of the current decoding block if the scanning mode is horizontal scanning; and
    determining that the string length encoding resolution of the current string is the height of the current decoding block if the scanning mode is vertical scanning.

5. The video decoding method according to claim 1, wherein the determining a string length encoding resolution of the current string comprises:
    setting a string length encoding resolution of all strings as a first target preset value, wherein the first target preset value is any one of the at least one preset values.

6. The video decoding method according to claim 1, wherein a sequence header of a video sequence corresponding to the bitstream that needs to be decoded comprises a first string length encoding resolution index, the first string length encoding resolution index indicates a string length encoding resolution of strings in the video sequence, and the determining a string length encoding resolution of the current string comprises:
    decoding the first string length encoding resolution index in the sequence header to obtain the string length encoding resolution of the strings in the video sequence, wherein
    the strings in the video sequence comprise the current string.

7. The video decoding method according to claim 1, wherein a picture header of a current picture corresponding to the current decoding block comprises a second string length encoding resolution index, the second string length encoding resolution index indicates a string length encoding resolution of strings in the current picture, and the determining a string length encoding resolution of the current string comprises:
    decoding the second string length encoding resolution index in the picture header to obtain the string length encoding resolution of the strings in the current picture, the strings in the current picture comprising the current string.

8. The video decoding method according to claim 1, wherein a slice header of a current slice corresponding to the current decoding block comprises a third string length encoding resolution index, the third string length encoding resolution index indicates a string length encoding resolution of strings in the current slice, and the determining a string length encoding resolution of the current string comprises:
  decoding the third string length encoding resolution index in the slice header to obtain the string length encoding resolution of the strings in the current slice, the strings in the current slice comprising the current string.

9. The video decoding method according to claim 1, wherein the bitstream that needs to be decoded comprises a largest coding unit corresponding to the current decoding block and a fourth string length encoding resolution index of the current decoding block, the fourth string length encoding resolution index indicates a string length encoding resolution of strings in the largest coding unit corresponding to the current decoding block, and the determining a string length encoding resolution of the current string comprises:
  decoding the fourth string length encoding resolution index to obtain the string length encoding resolution of the strings in the largest coding unit corresponding to the current decoding block, wherein
  the strings in the largest coding unit corresponding to the current decoding block comprise the current string.

10. The video decoding method according to claim 1, wherein the determining a string length encoding resolution of the current string comprises:
  obtaining a size of the current decoding block; and
  determining the string length encoding resolution of the current string according to the size of the current decoding block.

11. The video decoding method according to claim 10, wherein the size of the current decoding block comprises an area of the current decoding block, the area of the current decoding block is equal to a product of the width and the height of the current decoding block, and the determining the string length encoding resolution of the current string according to the size of the current decoding block comprises:
  determining that the string length encoding resolution of the current string is one integer pixel if the area of the current decoding block is less than or equal to a first threshold; or
  determining that the string length encoding resolution of the current string is one integer pixel if the width of the current decoding block is less than or equal to a second threshold and the height of the current decoding block is less than or equal to a third threshold.

12. The video decoding method according to claim 11, wherein the determining the string length encoding resolution of the current string according to the size of the current decoding block further comprises:
  determining that the string length encoding resolution of the current string is two integer pixels if the area of the current decoding block is greater than the first threshold; or
  determining that the string length encoding resolution of the current string is two integer pixels if the width of the current decoding block is greater than the second threshold and the height of the current decoding block is greater than the third threshold.

13. The video decoding method according to claim 1, wherein the determining a string length encoding resolution of the current string comprises:
  obtaining a format of a video sequence corresponding to the bitstream that needs to be decoded; and
  determining string length encoding resolutions of corresponding channel components of the current string according to the format of the video sequence.

14. The video decoding method according to claim 13, wherein the determining string length encoding resolutions of corresponding channel components of the current string according to the format of the video sequence comprises:
  determining, if the format of the video sequence is YUV4:2:0, that the corresponding channel components of the current string comprise a brightness component and a chrominance component;
  determining that a string length encoding resolution of the brightness component of the current string is four integer pixels; and
  determining that a string length encoding resolution of the chrominance component of the current string is two integer pixels.

15. The video decoding method according to claim 1, wherein the determining a string length encoding resolution of the current string comprises:
  obtaining a decoded string quantity of the current decoding block; and
  determining that the string length encoding resolution of the current string is a second target preset value if the decoded string quantity is greater than or equal to a decoded string threshold, wherein the second target preset value is any one of the at least one preset value.

16. The video decoding method according to claim 15, wherein the decoded string threshold is 1, 2, or 3; or
  the decoded string threshold is determined by:
  obtaining a size of the current decoding block; and
  setting the decoded string threshold according to the size of the current decoding block.

17. The method according to claim 1, wherein the pixel value encoding resolution of the unmatched pixel that needs to be decoded is equal to the string length encoding resolution of the current string.

18. The method according to claim 1, wherein:
  decoding the bitstream that needs to be decoded comprises: decoding the bitstream that needs to be decoded to obtain a to-be-decoded pixel quantity corresponding to the current string, the to-be-decoded pixel quantity being based on an undecoded pixel quantity of the current decoding block except for the current string after encoding according to the string length resolution of the current string; and
  obtaining a string length of the current string comprises:
    obtaining the undecoded pixel quantity of the current decoding block except for the current string according to the to-be-decoded pixel quantity and the string length resolution of the current string; and
    obtaining a string length of the current string according to the size of the current decoding block, the decoded pixel quantity, and the undecoded pixel quantity.

19. An electronic device, comprising:
  at least one processor; and
  a memory, configured to store at least one program, the at least one program, when executed by the at least one processor, causing the at least one processor to implement:
    obtaining a bitstream that needs to be decoded, the bitstream that needs to be decoded comprising a current decoding block, the current decoding block using an intra string copy mode, and the current decoding block comprising a current string;

determining a string length encoding resolution of the current string;

decoding the bitstream that needs to be decoded to obtain an encoded string length corresponding to the current string; and obtaining a string length of the current string according to the string length encoding resolution of the current string and the corresponding encoded string length, the string length encoding resolution of the current string being at least one of the following:

at least one preset value, each preset value being an integer pixel greater than or equal to 1; or a width or a height of the current decoding block, wherein the current decoding block comprises an unmatched pixel that needs to be decoded, and the method further comprises:

determining a pixel value encoding resolution of the unmatched pixel that needs to be decoded;

decoding the bitstream that needs to be decoded to obtain an encoded pixel value of the unmatched pixel that needs to be decoded; and obtaining a pixel value of the unmatched pixel that needs to be decoded according to the pixel value encoding resolution and the encoded pixel value.

20. A non-transitory computer-readable storage medium, storing a computer program, the computer program, when executed by a processor, implementing the video decoding method comprising:

obtaining a bitstream that needs to be decoded, the bitstream that needs to be decoded comprising a current decoding block, the current decoding block using an intra string copy mode, and the current decoding block comprising a current string;

determining a string length encoding resolution of the current string;

decoding the bitstream that needs to be decoded to obtain an encoded string length corresponding to the current string; and obtaining a string length of the current string according to the string length encoding resolution of the current string and the corresponding encoded string length, the string length encoding resolution of the current string being at least one of the following:

at least one preset value, each preset value being an integer pixel greater than or equal to 1; or a width or a height of the current decoding block, wherein the current decoding block comprises an unmatched pixel that needs to be decoded, and the method further comprises:

determining a pixel value encoding resolution of the unmatched pixel that needs to be decoded;

decoding the bitstream that needs to be decoded to obtain an encoded pixel value of the unmatched pixel that needs to be decoded; and obtaining a pixel value of the unmatched pixel that needs to be decoded according to the pixel value encoding resolution and the encoded pixel value.

\* \* \* \* \*